United States Patent
Hirson et al.

(10) Patent No.: US 9,135,616 B2
(45) Date of Patent: Sep. 15, 2015

(54) SYSTEMS AND METHODS TO FACILITATE ONLINE TRANSACTIONS

(71) Applicant: Boku, Inc., San Francisco, CA (US)

(72) Inventors: Ron Hirson, San Francisco, CA (US); Michael Cahill, San Rafael, CA (US)

(73) Assignee: Boku, Inc., San Francisco, CA (US)

( * ) Notice: Subject to any disclaimer, the term of this patent is extended or adjusted under 35 U.S.C. 154(b) by 0 days.

(21) Appl. No.: 14/092,447

(22) Filed: Nov. 27, 2013

(65) Prior Publication Data

US 2014/0089175 A1     Mar. 27, 2014

Related U.S. Application Data

(63) Continuation of application No. 12/886,267, filed on Sep. 20, 2010, now Pat. No. 8,660,911.

(60) Provisional application No. 61/245,255, filed on Sep. 23, 2009.

(51) Int. Cl.
*G06Q 20/32* (2012.01)
*G06Q 20/12* (2012.01)
*G06Q 20/16* (2012.01)
(Continued)

(52) U.S. Cl.
CPC .......... *G06Q 20/3255* (2013.01); *G06Q 20/12* (2013.01); *G06Q 20/16* (2013.01); *G06Q 20/32* (2013.01); *G06Q 20/38* (2013.01); *G06Q 20/42* (2013.01); *G06Q 30/06* (2013.01);
(Continued)

(58) Field of Classification Search
USPC ............................................... 705/26, 27, 39
See application file for complete search history.

(56) References Cited

U.S. PATENT DOCUMENTS

| 5,283,829 | A | 2/1994 | Anderson |
| 5,708,422 | A | 1/1998 | Blonder et al. |

(Continued)

FOREIGN PATENT DOCUMENTS

| GB | 2379525 | 3/2003 |
| JP | 2007109014 | 4/2007 |

(Continued)

OTHER PUBLICATIONS

GreenZap: "GreenZap Introduces New "Buy Now" Buttons, Enabling Merchants to Accept Payments at No Cost," Business Wire Aug. 4, 2006, PQDialog #445190533, 4pgs.*

(Continued)

*Primary Examiner* — Rob Pond
(74) *Attorney, Agent, or Firm* — Stephen M. De Klerk

(57) ABSTRACT

Systems and methods are provided to facilitate online transactions via mobile communications. In one aspect, a system includes a communication interface to receive an input from a merchant; a plurality of converters to interface with a plurality of controllers for delivery of premium messages sent by the system to collect funds for purchases made by customers; and a common format processor coupled with the plurality of converters to send the premium messages. The common format processor determines a combination of one or more premium messages, in response to a first customer making a first purchase from the merchant at a first price. The total price of the one or more premium messages is based on the first price and a portion of service charges associated with the one or more premium messages, where the portion is specified by the input received via the interface.

16 Claims, 11 Drawing Sheets

(51) Int. Cl.
*G06Q 20/38* (2012.01)
*G06Q 20/42* (2012.01)
*G06Q 30/06* (2012.01)

(52) U.S. Cl.
CPC ........ *G06Q30/0601* (2013.01); *G06Q 30/0617* (2013.01); *G06Q 30/0641* (2013.01)

(56) References Cited

U.S. PATENT DOCUMENTS

| | | |
|---|---|---|
| 5,845,260 A | 12/1998 | Nakano et al. |
| 5,905,873 A | 5/1999 | Hartmann et al. |
| 5,914,472 A | 6/1999 | Foladare et al. |
| 5,953,710 A | 9/1999 | Fleming |
| 6,227,447 B1 | 5/2001 | Campisano |
| 6,282,276 B1 | 8/2001 | Felger |
| 6,302,326 B1 | 10/2001 | Symonds et al. |
| 6,473,808 B1 | 10/2002 | Yeivin et al. |
| 6,612,488 B2 | 9/2003 | Suzuki |
| 6,704,409 B1 | 3/2004 | Dilip et al. |
| 6,718,178 B1 | 4/2004 | Sladek et al. |
| 6,788,771 B2 | 9/2004 | Manto |
| 6,807,410 B1 | 10/2004 | Pailles et al. |
| 6,965,872 B1 | 11/2005 | Grdina |
| 6,996,409 B2 | 2/2006 | Gopinath et al. |
| 7,013,125 B2 | 3/2006 | Henrikson |
| 7,080,049 B2 | 7/2006 | Truitt et al. |
| 7,089,208 B1 | 8/2006 | Levchin et al. |
| 7,107,068 B2 | 9/2006 | Benzon et al. |
| 7,174,301 B2 | 2/2007 | Florance et al. |
| 7,221,951 B2 | 5/2007 | Anvekar et al. |
| 7,292,996 B2 | 11/2007 | Nobrega et al. |
| 7,308,254 B1 | 12/2007 | Rissanen |
| 7,315,541 B1 | 1/2008 | Housel et al. |
| 7,331,518 B2 | 2/2008 | Rable |
| 7,357,310 B2 | 4/2008 | Calabrese et al. |
| 7,366,702 B2 | 4/2008 | David |
| 7,374,079 B2 | 5/2008 | Nam et al. |
| 7,386,477 B2 | 6/2008 | Fano |
| 7,437,331 B1 | 10/2008 | Rosenberger |
| 7,458,507 B2 | 12/2008 | Fillinger et al. |
| 7,478,055 B2 | 1/2009 | Goino |
| 7,487,114 B2 | 2/2009 | Florance et al. |
| 7,527,192 B1 | 5/2009 | Chaskin et al. |
| 7,748,614 B2 | 7/2010 | Brown |
| 7,752,135 B2 | 7/2010 | Brown et al. |
| 7,792,518 B2 | 9/2010 | Trioano et al. |
| 7,848,500 B2 | 12/2010 | Lynam et al. |
| 7,870,044 B2 | 1/2011 | Robertson |
| 7,870,077 B2 | 1/2011 | Woo et al. |
| 7,890,433 B2 | 2/2011 | Singhal |
| 8,073,774 B2 | 12/2011 | Pousti |
| 8,116,730 B2 | 2/2012 | Smith |
| 2001/0003093 A1 | 6/2001 | Lundin |
| 2001/0037264 A1 | 11/2001 | Husemann et al. |
| 2002/0013727 A1 | 1/2002 | Lee |
| 2002/0016769 A1 | 2/2002 | Barbara et al. |
| 2002/0035539 A1 | 3/2002 | O'Connell |
| 2002/0059146 A1 | 5/2002 | Keech |
| 2002/0087471 A1 | 7/2002 | Ganesan et al. |
| 2002/0111908 A1 | 8/2002 | Milberger et al. |
| 2002/0120582 A1 | 8/2002 | Elston et al. |
| 2002/0193094 A1 | 12/2002 | Lawless et al. |
| 2003/0065525 A1 | 4/2003 | Giachhetti et al. |
| 2003/0119478 A1 | 6/2003 | Nagy et al. |
| 2003/0125969 A1 | 7/2003 | Kizer et al. |
| 2003/0126076 A1 | 7/2003 | Kwok |
| 2003/0212601 A1 | 11/2003 | Silva et al. |
| 2004/0019564 A1 | 1/2004 | Goldhwaite et al. |
| 2004/0044582 A1 | 3/2004 | Chowdhary |
| 2004/0122685 A1 | 6/2004 | Bunce |
| 2004/0185827 A1 | 9/2004 | Parks |
| 2004/0230527 A1 | 11/2004 | Hansen et al. |
| 2004/0248596 A1 | 12/2004 | Panchal |
| 2004/0252814 A1 | 12/2004 | Eakin |

| | | | |
|---|---|---|---|
| 2005/0055296 A1 | 3/2005 | Hattersley et al. | |
| 2005/0055309 A1 | 3/2005 | Williams et al. | |
| 2005/0086164 A1 | 4/2005 | Kim et al. | |
| 2005/0177442 A1 | 8/2005 | Sullivan et al. | |
| 2005/0177517 A1 | 8/2005 | Leung et al. | |
| 2005/0197892 A1 | 9/2005 | Bilibin et al. | 705/13 |
| 2005/0199709 A1 | 9/2005 | Linlor | |
| 2005/0245257 A1 | 11/2005 | Woodhill | |
| 2006/0018450 A1 | 1/2006 | Sandberg-Diment | |
| 2006/0131390 A1 | 6/2006 | Kim | |
| 2006/0206709 A1 | 9/2006 | Labrou et al. | |
| 2006/0248011 A1 | 11/2006 | Hecht-Nielsen | |
| 2006/0253335 A1 | 11/2006 | Keena et al. | |
| 2006/0258331 A1 | 11/2006 | Syrett et al. | |
| 2006/0259438 A1 | 11/2006 | Randle et al. | |
| 2006/0276171 A1 | 12/2006 | Pousti | |
| 2006/0294025 A1 | 12/2006 | Mengerink | |
| 2007/0005467 A1 | 1/2007 | Haigh et al. | |
| 2007/0011104 A1 | 1/2007 | Leger et al. | |
| 2007/0022019 A1 | 1/2007 | Sherwin et al. | |
| 2007/0027775 A1 | 2/2007 | Hwang | |
| 2007/0027803 A1 | 2/2007 | Brandes et al. | |
| 2007/0043664 A1 | 2/2007 | Wilkes | |
| 2007/0055440 A1 | 3/2007 | Denker et al. | |
| 2007/0061244 A1 | 3/2007 | Ramer et al. | |
| 2007/0063017 A1 | 3/2007 | Chen et al. | |
| 2007/0094080 A1 | 4/2007 | Wilken | |
| 2007/0118477 A1 | 5/2007 | Graves et al. | |
| 2007/0123219 A1 | 5/2007 | Lovell, Jr. | |
| 2007/0123229 A1 | 5/2007 | Pousti | |
| 2007/0124490 A1 | 5/2007 | Kalavade et al. | |
| 2007/0130025 A1 | 6/2007 | Nakajima | |
| 2007/0130044 A1 | 6/2007 | Rowan | |
| 2007/0133768 A1 | 6/2007 | Singh | |
| 2007/0168462 A1 | 7/2007 | Grossberg | |
| 2007/0175978 A1 | 8/2007 | Stambaugh | |
| 2007/0198510 A1 | 8/2007 | Ebanks | |
| 2007/0203836 A1 | 8/2007 | Dodin | |
| 2007/0208632 A1 | 9/2007 | Downes et al. | |
| 2007/0233597 A1 | 10/2007 | Petersen et al. | |
| 2007/0244731 A1 | 10/2007 | Barhydt et al. | |
| 2007/0244811 A1 | 10/2007 | Tummianaro | |
| 2007/0250711 A1 | 10/2007 | Storey | |
| 2007/0255653 A1 | 11/2007 | Tumminard et al. | |
| 2007/0255662 A1 | 11/2007 | Tumminaro et al. | |
| 2007/0260556 A1 | 11/2007 | Pousti | |
| 2007/0265921 A1 | 11/2007 | Rempe | |
| 2007/0266034 A1 | 11/2007 | Pousti | |
| 2007/0266130 A1 | 11/2007 | Mazur et al. | |
| 2007/0270125 A1 | 11/2007 | Pousti | |
| 2008/0009263 A1 | 1/2008 | Pousti | |
| 2008/0010192 A1 | 1/2008 | Rackley, III et al. | |
| 2008/0040139 A1 | 2/2008 | Pousti | |
| 2008/0040265 A1 | 2/2008 | Rackley, III et al. | |
| 2008/0040733 A1 | 2/2008 | Pousti | |
| 2008/0051122 A1 | 2/2008 | Fisher | |
| 2008/0052091 A1 | 2/2008 | Vawter | |
| 2008/0052363 A1 | 2/2008 | Pousti | |
| 2008/0057904 A1 | 3/2008 | Pousti | |
| 2008/0082509 A1 | 4/2008 | Bessieres et al. | |
| 2008/0091614 A1 | 4/2008 | Bas Bayod et al. | |
| 2008/0097851 A1 | 4/2008 | Bemmel et al. | |
| 2008/0103984 A1 | 5/2008 | Choe et al. | |
| 2008/0109279 A1 | 5/2008 | Csoka | |
| 2008/0109528 A1 | 5/2008 | Knight et al. | |
| 2008/0120698 A1 | 5/2008 | Ramia | |
| 2008/0126145 A1 | 5/2008 | Rackley, III et al. | |
| 2008/0133403 A1 | 6/2008 | Hamzeh | |
| 2008/0133735 A1 | 6/2008 | Thayer et al. | |
| 2008/0140569 A1 | 6/2008 | Handel | |
| 2008/0154727 A1 | 6/2008 | Carlson | |
| 2008/0154772 A1 | 6/2008 | Carlson | |
| 2008/0167017 A1 | 7/2008 | Wentker et al. | |
| 2008/0177628 A1 | 7/2008 | Payette | |
| 2008/0177661 A1 | 7/2008 | Mehra | |
| 2008/0189186 A1 | 8/2008 | Choi et al. | |
| 2008/0189211 A1 | 8/2008 | Obadia et al. | |
| 2008/0201201 A1 | 8/2008 | Pousti | |
| 2008/0208739 A1 | 8/2008 | Phillips | |

(56) References Cited

U.S. PATENT DOCUMENTS

| | | |
|---|---|---|
| 2008/0228595 A1 | 9/2008 | Hill et al. |
| 2008/0233918 A1 | 9/2008 | Pousti |
| 2008/0275779 A1 | 11/2008 | Lakshminarayanan |
| 2008/0281726 A1 | 11/2008 | Gupta |
| 2008/0287095 A1 | 11/2008 | Pousti |
| 2008/0288299 A1 | 11/2008 | Schultz |
| 2008/0288351 A1 | 11/2008 | Leung et al. |
| 2009/0006184 A1 | 1/2009 | Leach et al. |
| 2009/0006217 A1 | 1/2009 | Smith |
| 2009/0024614 A1 | 1/2009 | Pousti |
| 2009/0029687 A1 | 1/2009 | Ramer et al. |
| 2009/0044216 A1 | 2/2009 | McNicoll |
| 2009/0055292 A1 | 2/2009 | Chong et al. |
| 2009/0063178 A1 | 3/2009 | Pousti et al. |
| 2009/0063312 A1 | 3/2009 | Hurst |
| 2009/0070583 A1 | 3/2009 | Von Mueller et al. |
| 2009/0081989 A1 | 3/2009 | Wuhrer |
| 2009/0104888 A1 | 4/2009 | Cox |
| 2009/0112765 A1 | 4/2009 | Skowronek |
| 2009/0112768 A1 | 4/2009 | Hammad et al. |
| 2009/0119190 A1 | 5/2009 | Realinij |
| 2009/0124238 A1 | 5/2009 | Wilson |
| 2009/0150257 A1 | 6/2009 | Abrams et al. |
| 2009/0156170 A1 | 6/2009 | Rossano et al. |
| 2009/0157792 A1 | 6/2009 | Fiatal |
| 2009/0164369 A1* | 6/2009 | Fletcher .......................... 705/40 |
| 2009/0172402 A1 | 7/2009 | Tran |
| 2009/0177581 A1 | 7/2009 | Garcia et al. |
| 2009/0182634 A1 | 7/2009 | Park et al. |
| 2009/0182674 A1 | 7/2009 | Patel et al. |
| 2009/0192928 A1 | 7/2009 | Abifaker |
| 2009/0204546 A1 | 8/2009 | Haidar |
| 2009/0216687 A1 | 8/2009 | Burdick |
| 2009/0220060 A1 | 9/2009 | Wilson |
| 2009/0248483 A1 | 10/2009 | Kiefer |
| 2009/0265273 A1 | 10/2009 | Guntupali et al. |
| 2009/0281904 A1 | 11/2009 | Pharris |
| 2010/0010911 A1 | 1/2010 | Smith |
| 2010/0015944 A1 | 1/2010 | Smith |
| 2010/0015957 A1 | 1/2010 | Smith |
| 2010/0017285 A1 | 1/2010 | Smith |
| 2010/0049654 A1 | 2/2010 | Pilo |
| 2010/0057623 A1 | 3/2010 | Kapur et al. |
| 2010/0070757 A1 | 3/2010 | Martinez |
| 2010/0094732 A1 | 4/2010 | Smith |
| 2010/0106620 A1 | 4/2010 | Marcus |
| 2010/0114775 A1 | 5/2010 | Griffen |
| 2010/0125514 A1 | 5/2010 | Blackhurst et al. |
| 2010/0145802 A1 | 6/2010 | Nowacek et al. |
| 2010/0153249 A1 | 6/2010 | Yuan et al. |
| 2010/0179907 A1 | 7/2010 | Atkinson |
| 2010/0190471 A1 | 7/2010 | Smith |
| 2010/0191646 A1 | 7/2010 | Smith |
| 2010/0191648 A1 | 7/2010 | Smith |
| 2010/0216425 A1 | 8/2010 | Smith |
| 2010/0217696 A1 | 8/2010 | Schuba et al. |
| 2010/0223183 A1 | 9/2010 | Smith |
| 2010/0235276 A1 | 9/2010 | Smith |
| 2010/0250359 A1 | 9/2010 | Gillenson et al. |
| 2010/0250379 A1 | 9/2010 | Giordano et al. ............ 705/20 |
| 2010/0250687 A1 | 9/2010 | Smith |
| 2010/0267362 A1 | 10/2010 | Smith et al. |
| 2010/0293065 A1 | 11/2010 | Brody et al. .................... 705/26 |
| 2010/0299220 A1 | 11/2010 | Baskerville |
| 2010/0299731 A1 | 11/2010 | Atkinson |
| 2010/0306015 A1 | 12/2010 | Kingston |
| 2010/0306099 A1 | 12/2010 | Hirson |
| 2010/0312645 A1 | 12/2010 | Niejadlik |
| 2010/0312678 A1 | 12/2010 | Davis |
| 2011/0010292 A1 | 1/2011 | Giordano et al. |
| 2011/0022484 A1 | 1/2011 | Smith et al. |
| 2011/0035264 A1 | 2/2011 | Zaloom |
| 2011/0035302 A1 | 2/2011 | Martell et al. |
| 2011/0065418 A1 | 3/2011 | Ryu et al. |
| 2011/0072039 A1 | 3/2011 | Tayloe |
| 2011/0078077 A1 | 3/2011 | Hirson |
| 2011/0082767 A1 | 4/2011 | Ryu et al. |
| 2011/0082772 A1 | 4/2011 | Hirson |
| 2011/0125610 A1 | 5/2011 | Goodsall et al. |
| 2011/0143710 A1 | 6/2011 | Hirson |
| 2011/0143711 A1 | 6/2011 | Hirson |
| 2011/0295750 A1 | 12/2011 | Rammal |

FOREIGN PATENT DOCUMENTS

| | | |
|---|---|---|
| JP | 2007179383 | 7/2007 |
| KR | 20000036574 | 7/2000 |
| KR | 20030030684 | 4/2003 |
| KR | 20060103797 | 10/2006 |
| KR | 20070051817 | 5/2007 |
| KR | 20070103650 | 10/2007 |
| KR | 20080011338 | 2/2008 |
| WO | 9738538 | 10/1997 |
| WO | WO-2006/092726 A2 | 9/2006 |
| WO | WO-2007004792 | 1/2007 |
| WO | WO-2007094593 | 7/2007 |
| WO | 2007102648 | 9/2007 |
| WO | 2007127521 | 11/2007 |
| WO | WO-2009/036511 | 3/2009 |
| WO | 2009044396 | 4/2009 |

OTHER PUBLICATIONS

GreenZap.com Merchant Tools, Internet Archive Wayback Machine, 2006, 2pgs.*
International Application No. PCT/US12/25195, International Filing Date Feb. 15, 2012, International Search Report and Written Opinion, Apr. 26, 2012.
"International Application No. PCT/US2011/029760", International Search Report and Written Opinion, Oct. 28, 2011.
"International Application No. PCT/US2011/051094", International Search Report and Written Opinion, Dec. 23, 2011.
European Patent Application No. 09711520.8, Extended Search Report mailed Apr. 27, 2011.
International Application No. PCT/US2010/050616, International Search Report and Written Opinion, Apr. 26, 2011.
International Application No. PCT/US2011/30039, International Search Report and Written Opinion, May 23, 2011.
International Application No. PCT/US2011/30038, International Search Report and Written Opinion, May 25, 2011.
Onebip S.R.L , "OneBip—to Pay Online with Your Mobile Phone", Youtube online video at http://www.youtube.com/watch?v=RiEsMcc0tJY, May 23, 2007.
Arrington, Michael , "Mobile Payments Getting Traction on Social Networks but Fees are Sky High", Tech Crunch, located a http://techcrunch.com/2009/01/13mobile-payments-getting-traction-on-social-networks-but-fees-are-sky-high/,, Jan. 13, 2009.
Brooks, Rod , "MobilCash:Worlds First in Mobile Payments", YouTube online video located at http://youtube.com/wacth?v=j6Xv35qSmbg,, Oct. 12, 2007.
Bruene, Jim , "PayPal Launches on Facebook: Who Wants to be the First Bank?", located at http://www.netbanker.com/2007/06paypal_on_facebook_who_wants_to_be_the_first_bank_on_facebook.hml,, Jun. 22, 2007.
Chen, Will , "Gift Shop Credits Have Arrived", The Facebook Blog, located at gttp://blog.facebook.com/blog.php?post=36577782130, Oct. 31, 2008.
Federal Trade Commission, , "Children's Online Privacy Protection Act (COPPA)", 15 U.S.C. §§ 6501-6506, Oct. 21, 1998.
Ihlwan, Moon , "In Korea, Cell Phones Get a New Change", http://businessweek.com/globalbiz/content/mar2006/gb20060301_260288.htm, Mar. 1, 2006.
Lee, Jessica , "Payment Industry Perspectives: Q&A with Zong CEO David Marcus", http://www.insidefacebook.com/2009/05/19payment-industry-perspectives-qa-with-zong-ceo-david-marcus/, May 19, 2009.
Nicole, Kirsten , "Pay me Lets You Send and Receive Money Through Facebook", http://mashable.com/2007/06/17pay-me-facebook-app, Jun. 17, 2007.
Zong, Inc., ,"Virtual Goods/Currency and Mobile Payments: The Business Model for Social Apps", The Zong Blog at http://blog-

(56) References Cited

OTHER PUBLICATIONS zong.com/2008/10/25/virtual-goods-currency-and-mobile-payments-the business-model-for-social-apps/, Oct. 28, 2008.
Zong, Inc., , "Zong Mobile Payment Demo on a Facebook App", You Tube online video at http://www.youtube.com/watch?v=aLjRcAFrGil, Jan. 5, 2009.
Zong, Inc., , "Zong—Mobile Payments for Your Web App", You tube online video at http://www.youtube.com/watch?v=O2C3SQraAvO, Sep. 5, 2008.
Zong, Inc., , "Zong Mobile Payments in Smallworlds", You Tube online video at htttp://www.youtube.com/watch?v=Y6CEw3tSgBc, Feb. 10, 2009.
Amazon.com, Inc., "Get Gold Box Deals Every Day with Amazon Text Alerts," located at http://www.amazon.com/gp/anywhere/sms/goldbox, available at least by Jun. 10, 2009.
Aradiom Inc., "The Real Solution—Aradiom SolidPass", located at http://www.aradiom.com/SolidPass/2fa-OTP-security-token.htm, available at least by Apr. 24, 2009.
Chua, Lye Heng, "How Customers Applied Java CAPS?" Sun Microsystems, Inc. presentation, Nov. 6, 2007.
Hassinen, Marko et al., "An Open, PKI-Based Mobile Payment System," Emerging Trends in Information and Communication Security, Lecture Notes in Computer Science, vol. 3995/2006, pp. 86-89, Jun. 1, 2006.
International Application No. PCT/US2009/033823, International Search Report and Written Opinion, Sep. 24, 2009.
International Application No. PCT/US2009/039723, International Search Report and Written Opinion, Oct. 30, 2009.
International Application No. PCT/US2010/020189, International Search Report and Written Opinion, Dec. 10, 2010.
International Application No. PCT/US2010/021054, International Search Report and Written Opinion, Jul. 29, 2010.
International Application No. PCT/US2010/024525, International Search Report and Written Opinion, May 17, 2010.
International Application No. PCT/US2010/024535, International Search Report and Written Opinion, May 25, 2010.
International Application No. PCT/US2010/030338, International Search Report & Written Opinion, Jun. 3, 2010.
International Application No. PCT/US2010/032668, International Search Report and Written Opinion, Jul. 1, 2010.
International Application No. PCT/US2010/036940, International Search Report and Written Opinion, Jul. 21, 2010.
International Application No. PCT/US2010/037816, International Search Report and Written Opinion, Aug. 5, 2010.
International Application No. PCT/US2010/042703, International Search Report and Written Opinion, Sep. 13, 2010.
International Application No. PCT/US2010/046266, International Search Report and Written Opinion, Oct. 20, 2010.
International Application No. PCT/US2010/057472, International Search Report and Written Opinion, Jan. 18, 2011.
International Application No. PCT/US2010/059295, International Search Report and Written Opinion, Feb. 1, 2011.
International Application No. PCT/US2010/059466, International Search Report and Written Opinion, Feb. 1, 2011.
International Application No. PCT/US2011/022419, International Search Report and Written Opinion, Mar. 29, 2011.
International Application No. PCT/US2011/022426, International Search Report and Written Opinion, Mar. 28, 2011.
Mobilians Co. Ltd., company website located at http://www.mobilians.co.kr/english/, available at least by Jan. 12, 2009.
PayPal, Inc., "Get What You Want, When You Want It," located at https://www.paypal.com/cgi-bin/webscr?cmd=xpt/Marketing/mobile/MobileBuyStuff-outside, available at least by Mar. 5, 2009.
PayPal, Inc., "Texting with PayPal—Easy as Lifting a Finger," located at https://www.paypal.com/cgi-bin/webscr?cmd=xpt/Marketing/mobile/MobileAdvancedFeatures-outside, available at least by Mar. 5, 2009.
Squidoo, LLC, "Introducing MobillCash: Make a Secure Sale Even When an Online Customer Has No Cash, Credit Cards or I.D.," located at http://www.squidoo.com/mobillcash-pay-by-mobile-phone, available at least by Aug. 29, 2008.
Sun Microsystems Inc., "The Road to Mobile Banking," white paper, Jun. 2008.
Tindal, Suzanne, "St. George Counts Down to Two-Factor Authentication," ZDNet Australia, Feb. 19, 2008.
Trusted Mobile Payment Framework, "Scheme Rules," version 2.0, Aug. 6, 2008.
VISUALtron Software Corporation, "2-Factor Authentication—What is MobileKey?" located at http://www.visualtron.com/products_mobilekey.htm, available at least by 2008.
Wikimedia Foundation, Inc., "Authentication," located at en.wikipedia.org/wiki/Authentication, Mar. 17, 2009.
Wikimedia Foundation, Inc., "Credit Card," located at en/wikipedia.org/wiki/Credit_card, Dec. 5, 2008.
Wikimedia Foundation, Inc., "Security Token," located at en.wikipedia.org/wiki/Security_token, Apr. 13, 2009.
Wikimedia Foundation, Inc., "Two-Factor Authentication," located at en.wikipedia.org/wiki/Two-factor_authentication, Apr. 24, 2009.
Zabawskyj, Bohdan, "In the Media: The Mobile Money Opportunity," Billing World and OSS Today, located at http://www.redknee.com/news_events/in_the_media/43/?PHPSESSID=1e0ca1ab057bf9dc2c88104877ca8010, Sep. 2007.

* cited by examiner

SYSTEMS AND METHODS TO FACILITATE ONLINE TRANSACTIONS

CROSS-REFERENCE TO RELATED APPLICATIONS

The present application is a continuation of U.S. patent application Ser. No. 12/886,267, filed Sep. 20, 2010, which claims the benefit of provisional U.S. Pat. App. Ser. No. 61/245,255, filed Sep. 23, 2009 and entitled "Systems and Methods to Facilitate Online Transactions," the disclosures of which are hereby incorporated herein by reference.

FIELD OF THE TECHNOLOGY

At least some embodiments of the disclosure relate to mobile communications in general and, more particularly but not limited to, mobile communications to facilitate online transactions.

BACKGROUND

Short Message Service (SMS) is a communications protocol that allows the interchange of short text messages between mobile telephone devices. SMS messages are typically sent via a Short Message Service Center (SMSC) of a mobile carrier, which uses a store-and-forward mechanism to deliver the messages. When a mobile telephone is not reachable immediately for the delivery of the message, the SMSC stores the message for later retry.

SMS messages can be sent via gateways. Some gateways function as aggregators. An aggregator typically does not have the capacity the deliver the messages directly to the mobile phones. An aggregator typically interfaces with and relies upon the SMSC of a mobile carrier to deliver SMS messages.

Some gateways function as providers that are capable of sending text messages to mobile devices directly, without going through the SMSC of other mobile operators.

Text messaging between mobile telephones can also be performed using other protocols, such as SkyMail and Short Mail in Japan.

Some mobile carriers provide email gateway services to allow text messages to be sent to mobile phones via email. For example, a non-subscriber of the mobile carrier may send a message to an email address associated with a mobile phone of a subscriber of the mobile carrier to have the message delivered to the mobile phone via text messaging.

Emails can also be sent to mobile telephone devices via standard mail protocols, such as Simple Mail Transfer Protocol (SMTP) over Internet Protocol Suite (commonly TCP/IP, named from two of the protocols: the Transmission Control Protocol (TCP) and the Internet Protocol (IP)).

Short messages may be used to provide premium services to mobile phones, such as news alerts, ring tones, etc. The premium content providers may send the messages to the SMSC of the mobile operator using a TCP/IP protocol, such as Short Message Peer-to-peer Protocol (SMPP) or Hypertext Transfer Protocol, for delivery to a mobile phone; and the mobile phone is billed by the mobile operator for the cost of receiving the premium content.

Premium services may also be delivered via text messages initiated from the mobile phone. For example, a televoting service provider may obtain a short code to receive text messages from mobile phones; and when the user sends a text message to the short code, the mobile carrier routes the message to the televoting service provider and charges the user a fee, a portion of which is collected for the televoting service provider.

SUMMARY OF THE DESCRIPTION

Systems and methods are provided to facilitate online transactions via mobile communications. Some embodiments are summarized in this section.

In one aspect, a system includes a communication interface to receive an input from a merchant; a plurality of converters to interface with a plurality of controllers for delivery of premium messages sent by the system to collect funds for purchases made by customers; and a common format processor coupled with the plurality of converters to send the premium messages. The converters communicate with the controllers in different formats; the converters communicate with the common format processor in a common format; and the common format processor determines a combination of one or more premium messages, in response to a first customer making a first purchase from the merchant at a first price. The total price of the one or more premium messages is based on the first price and a portion of service charges associated with the one or more premium messages, where the portion is specified by the input received via the interface.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, an interchange is used to interface with a plurality of different controllers of mobile communications, such as SMS messages. The interchange can be used to receive deposit requests and payment requests in an online environment. The interchange is configured to communicate with the mobile phones through the different controllers to provide security and convenience for online transactions.

Figure 1:
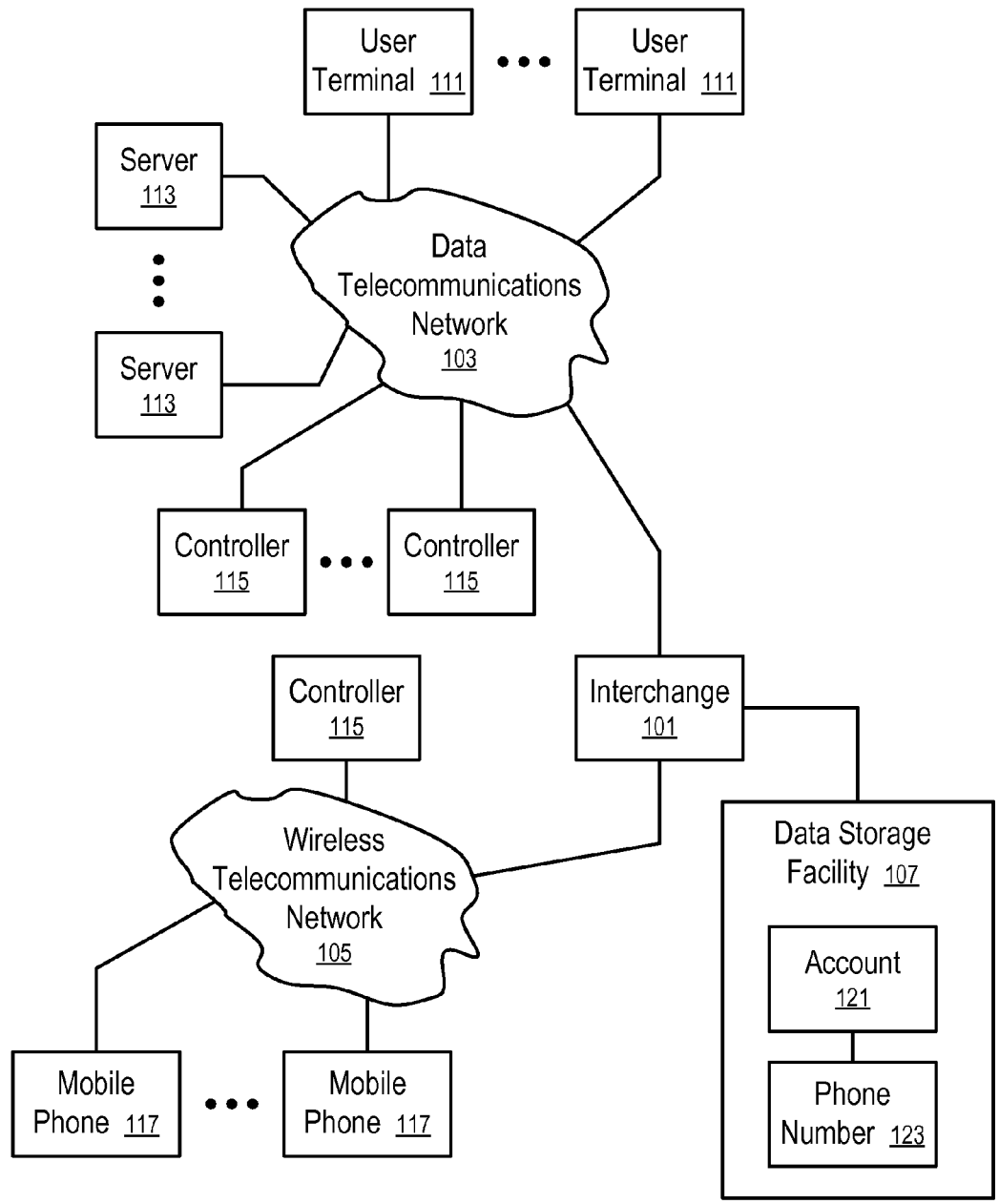
FIG. 1 shows a system to facilitate online transactions according to one embodiment.

FIG. 1 shows a system to facilitate online transactions according to one embodiment. In FIG. 1, an interchange (101) is provided to interface with a plurality of different controllers (115) for communications with the mobile phones (117) over the wireless telecommunications network (105).

In FIG. 1, a data storage facility (107) stores user accounts (121) and the corresponding phone numbers (123) of the mobile phones (117). The interchange (101) is coupled with the data storage facility (107) to confirm operations in the accounts (121) of the users via mobile communications with the mobile phones (117) at the corresponding phone numbers (123).

In FIG. 1, the interchange (101) may communicate with different controllers (115) of mobile communications via different networks (e.g., 105 and 103) and/or protocols. The interchange processes the requests in a common format and uses a set of converters for communications with the different controllers (115) respectively.

For example, the controllers (115) may be different aggregators, providers and/or SMSCs of different mobile carriers. Based on the phone numbers (123), the interchange (101) interfaces with the corresponding controllers (115) to communicate with the mobile phones (117) via text messaging to confirm the operations related to the corresponding accounts (121).

In FIG. 1, the user terminals (111) may use a unified interface to send requests to the interchange (101). For example, a website of the interchange (101) may be used to receive deposit requests from the web browsers running in the user terminals (111). The deposit requests may be received directly from the user terminal (111), or via a third party which interfaces between the interchange (101) and the user terminal (111). For example, the third party may operate a website to receive deposit requests from the user terminal (111) and provide the deposit requests to the interchange (101) via an application programming interface (API) (e.g., an API provided using a web service). The user terminals (111) are typically different from the mobile phones (117). In some embodiments, users may use the mobile phone (117) to access the web and submit the deposit request. Alternatively, the users may use the mobile phone (117) to submit the deposit requests via text messaging, email, instant messaging, etc.

The use of the mobile phones (117) in the confirmation of the accounts (121) increases the security of the transaction, since the mobile phones (117) are typically secured in the possession of the users.

Further, in one embodiment, the interchange (101) may use the phone bills of the mobile phones (117) to collect funds for the accounts (121) that are associated with the mobile phones (117) for the convenience of the users (e.g., those who do not have a credit card or a bank account).

In one embodiment, once the user accounts (121) are funded through the mobile phones (117), the users may use the user terminals (111) to access online servers (113) to make purchases. The users can use the accounts (121) to make the payment for the purchases, using the user terminals (111), without revealing their financial information to the operators of the servers (113).

In other embodiments, the interchange (101) may use other fund sources to deposit funds into the account (121). For example, the data storage facility (107) may further store information about other financial accounts of the user, such as bank accounts, credit card accounts, PayPal accounts, etc. (not shown in FIG. 1). Such information about the financial accounts of the user can be associated with the phone number (123) in the data storage facility (107). In response to a deposit request from the user terminal (111), the interchange (101) may identify the phone number (123) to retrieve the information about at least one financial account of the user. Using the phone number (123), the interchange (101) may transmit a confirmation message to the corresponding mobile phone (117). If the user replies to the confirmation message from the mobile phone (117), the interchange (101) may charge the financial account of the user (e.g., via automated clearing house (ACH)) using the information about the financial account to deposit funds into the account (121) of the user. Alternatively, the user may provide the information about the financial account (e.g., a bank account, a credit card number, a charge card number, etc.) from the mobile phone (117) together with the user's reply to the confirmation message. Alternatively, the user may provide the information about the financial account (e.g., a bank account, a credit card number, a charge card number, etc.) from the user terminal (111) together with the deposit request.

In one embodiment, the funds stored in the account (123) are in the unit of a currency (e.g., U.S. dollar, Euro, British pound, etc.) In some embodiments, the funds stored in the account (123) may be in the equivalent unit of a currency, such as points, stars, virtual currency/money, etc.

In one embodiment, the mobile phones (117) are used by the corresponding users to make payments and/or manage funds, such as for making purchases on various websites hosted on the servers (113) of merchants and service providers and/or for transferring funds to or from an account (121) hosted on the data storage facility (107), or other accounts, such as telecommunication accounts of the mobile phones (117) with telecommunication carriers, phone bills of landline telephone services, credit card accounts, debit card accounts, bank accounts, etc. The mobile phones (117) are used to confirm and/or approve the transactions associated with the account (121) (or other accounts). The interchange (101) interfaces the mobile phones (117) and the servers (113) to confirm and/or approve transactions and to operate on the account (121) (and/or other accounts associated with the phone number (123)).

For example, the user terminal (111) may provide the phone numbers (123) to the servers (113) to allow the servers (113) to charge the accounts (121) via the interchange (101). The interchange (101) sends a message to the mobile phone (117) via the phone number (123) to confirm the payment. Once the payment is confirmed via the corresponding mobile phone (117), the interchange (101) pays the server (113) using the funds from the corresponding account (121) (and/or other accounts associated with the phone number (123), such as bank accounts, credit card accounts, debit card accounts, mobile phone bills/accounts, land-line phone bill/accounts, etc.).

In one embodiment, the user terminal (111) may not even provide the phone number (123) to the server (113) to process the payment. The server (113) redirects a payment request to the interchange (101), which then prompts the user terminal (111) to provide the phone number (123) to the website of the interchange (101).

For example, the server (113) may redirect the payment request to the website of the interchange (101) with a reference indicating the purchase made via the user terminal (111). The interchange (101) can use the reference to complete the payment with the server (113) for the purchase, after receiving the phone number (123) directly from the user terminal (111), or other information identifying the account (121), to confirm the payment via the mobile phone (117).

In one embodiment, when the interchange (101) charges on the phone bill of the mobile phone (117) to fund the account (121), the mobile carrier of the mobile phone (117) may deduct a portion of the billed amount from the funds provided to the interchange (101). Thus, the interchange (101) actually receives only a portion of the amount billed to the mobile phone (117). However, the interchange (101) may credit the full amount to the account (121) associated with the mobile phone (117). The fees taken by the mobile carrier can be recovered through charging the user and/or the merchant for the usage of the account (121).

For example, the interchange (101) may charge the account (121) a fee for paying the server (113) to complete a purchase; and the interchange (101) may charge the server (113) a fee for transferring the funds to the server (113) (e.g., by deducting a portion from the amount paid by the user to the operator of the server (113)). For example, the interchange (101) may charge a periodic fee (e.g., a monthly fee) to maintain the account (121). The interchange (101) may charge a fee when the funds are initially deposited into the account (121) via the mobile phone (117), where the fee is smaller than the fee charged by the mobile carrier.

In one embodiment, the overall fees charged by the interchange (101) may be equal to or larger than the initial fees charged by the mobile carrier to deposit the funds into the account (121), to avoid losing money. In some embodiment, the operations of the interchange (101) may be supported by advertisements; and the interchange (101) may charge less than what the mobile carrier charges to deposit the funds into the account (121).

For example, the interchange (101) may spread out the charges by the mobile carrier for depositing the funds into the account (121) on a per transaction basis or a per process basis, instead of a lump sum at the time the user deposits funds into his account (121).

For example, the interchange (101) may charge the user account (121) a smaller fee than what the mobile carrier charges, when the funds are initially deposited into the user account (121) via the mobile carrier. For instance, when a user deposits $10 to the account (121) via the mobile carrier, the mobile carrier may take $3 (30%), providing $7 to the interchange (101). The interchange (101) may charge the user only $1, and thus credit the account (121) with $9; alternatively, the interchange (101) may credit the account (121) with the full $10, without deducting the amount that is charged by the mobile carrier, at the time the funds are deposited.

However, for the amount credited to the account (121), the interchange (101) is configured to pass to the merchants only $7 of the funds received from the mobile carrier for the purchases made by the user. The merchants may be the operators of the servers (113). The interchange (101) may charge the user and/or the merchant fees on a per transaction basis. For example, the user may be charged an amount for a payment to the merchant; and the merchant may be charged another amount for the payment. Thus, the fees charged by the mobile carrier are actually deferred until the funds in the account are used; and the cost for the fees charged by the mobile carrier can be shared by the user and the merchant.

In some embodiments, the user may request a loan from the interchange (101) for the account (121); and the loan is repaid through billing the mobile phone (117). The interchange (101) may charge interest for the loan.

Figure 2:
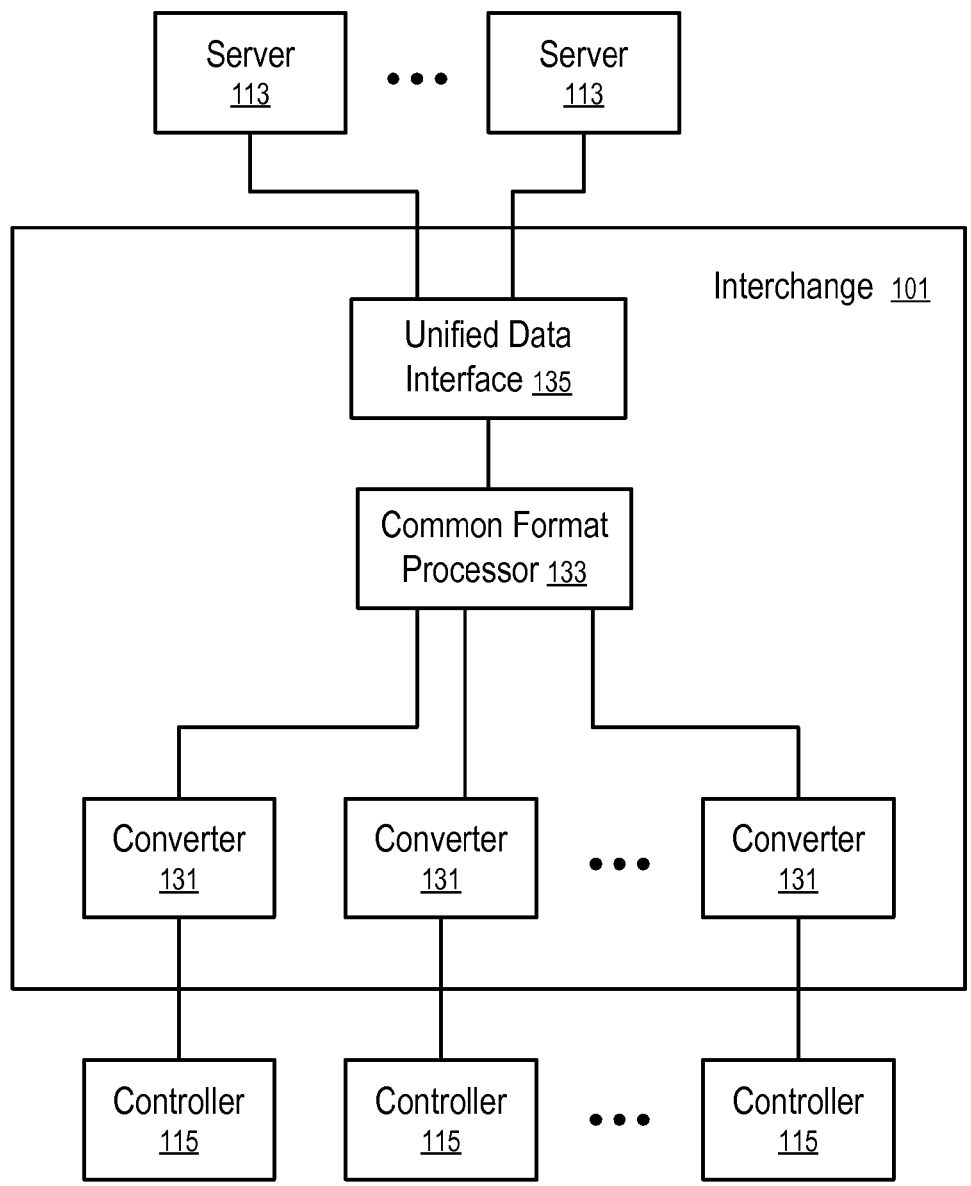
FIG. 2 shows an interchange to route messages according to one embodiment.

FIG. 2 shows an interchange to route messages according to one embodiment. In FIG. 2, the interchange (101) includes a unified data interface (135) for interaction with the servers (113). The servers (113) may redirect the payment requests to the interchange (101) to allow the interchange (101) to subsequently communicate with the user to process the payment request, including obtaining payment options and identifying user accounts (121), before returning to communicating with the server (113). Alternatively, the servers (113) may collect account related information (e.g., the phone number of the user) to request payment from the interchange (101).

In FIG. 2, the interchange (101) includes a common format processor (133), which processes various payment options in a common format. In one embodiment, the common format processor (133) can handle the payments via mobile terminated text message, mobile originated text message, operator bill, credit card, stored value account (121), and other online payment options. The common format processor (133) determines the actual amount that is to be billed to the user, based on the payment options (e.g., mobile terminated premium SMS, mobile originated premium SMS, operator billing, credit cards, etc.), and selects a converter (131) to communicate with a corresponding controller (115).

Different converters (131) are configured to communicate with corresponding controllers (115) in different languages and protocols. The converters (131) perform the translation between the common format used by the common format processor (133) and the corresponding formats used by the controllers (115).

The use of the common format processor (133) simplifies the structure of the interchange (101) and reduces the development effort required for the interchange (101) to interface with the increasing number of different controllers, such as SMSC, mobile providers, aggregators, gateways, etc.

Figure 3:
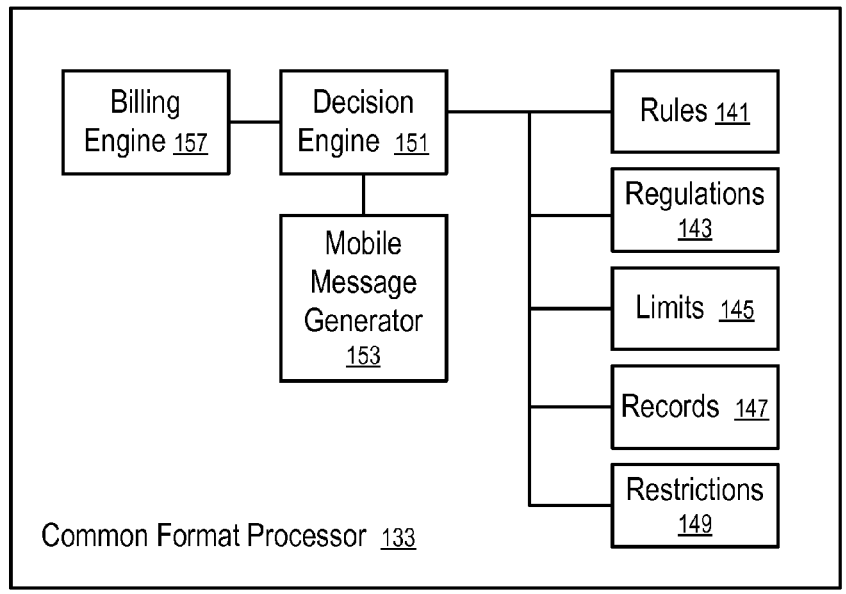
FIG. 3 shows a message processor according to one embodiment.

FIG. 3 shows a message processor according to one embodiment. In FIG. 3, the common format processor (133) includes a billing engine (157) that calculates the amount to be billed to the user, by adding or subtracting transaction costs for different billing methods, such as mobile terminated text message, mobile originated text message, operator bill, credit card, stored value account (121), and other online payment options.

The common format processor (133) includes a decision engine (151) which decides how to generate a set of one or more messages to the mobile phone (117), based on a set of rules (141), regulations (143), limits (145), records (147) and restrictions (149).

For example, different countries have different regulations (143) governing the mobile communications with the mobile phones (117). For example, different mobile carriers have different rules (141) regarding premium messages. For example, past transaction records (147) can be used to monitor the transactions to discover suspected fraudulent activities. For example, parental limits (145) and merchant restrictions (149) can be imposed.

Base on results of the decision engine (151), the mobile message generator (153) generates one or more messages to communicate with the mobile phone (117) about the transaction (e.g., a deposit request or a payment request). The converter (131) then interfaces with the corresponding controller (115) to transmit the messages to the mobile phones (117).

Figure 4:
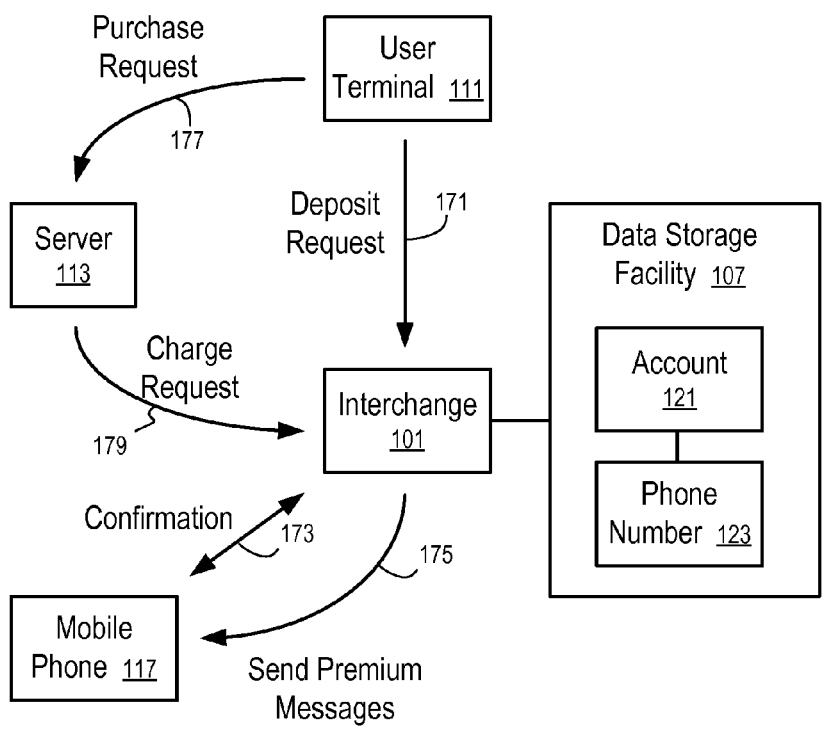
FIG. 4 shows a method to facilitate an online transaction using an interchange according to one embodiment.

FIG. 4 shows a method to facilitate an online transaction using an interchange according to one embodiment. In FIG. 4, the interchange (101) receives a deposit request (171) from a user via a user terminal (111), such as a device running a web browser. The user terminal (111) is typically different from the mobile phone (117). However, in some embodiments, the mobile phone (117) may also be used as the user terminal (111) to submit the deposit request (171).

The deposit request (171) may be a request for a loan to fund the user account (121) associated with the phone number (123) and stored in the data storage facility (107), or a request to fund the account (121) via premium messages (175) charged to the mobile phone (117). The loan may be repaid via subsequent premium messages (175) charged to the mobile phone (117).

In FIG. 4, the deposit request (171) is confirmed via a round trip confirmation message from the interchange (101) to the mobile phone (117), such as a round trip SMS message. Alternatively, the confirmation messages can be sent to the mobile phone (117) associated with the phone number (123) via emails, instant messages, etc. After the confirmation, the interchange (101) sends the premium messages (175) to bill the mobile phone (117) for the deposit (or to make a loan to the account (121)). In other embodiments, the interchange (101) may charge a credit card account, or a bank account, associated with the phone number (123) to fund the account (121). In some embodiments, the interchange (101) may send an instruction with the confirmation message to the mobile phone (117) to instruct the user to send mobile originated premium messages to the interchange to fund the account (121).

The account (121) stored in the data storage facility (107) can be used to pay purchases made via the server (113). For example, after the user terminal (111) transmits the purchase request (177) to the server (113), the server (113) redirects the purchase request to the interchange (101), or directly contacts the interchange (101) for the payment (e.g., after collecting account information, such as the phone number (123), from the user terminal (111)).

To complete the payment, the interchange (101) contacts the mobile phone (117) via text messaging (or other types of messages, such as instant messages, emails, etc.) to confirm the payment. The interchange (101) uses the funds in the account (121) to make the payment once a confirmation is obtained from the mobile phone (117). For example, the interchange (101) may use its own bank account to pay the merchant operating the server (113) and deduct an amount from the account (121). Thus, the financial information of the user is not revealed to the merchant.

Figure 5:
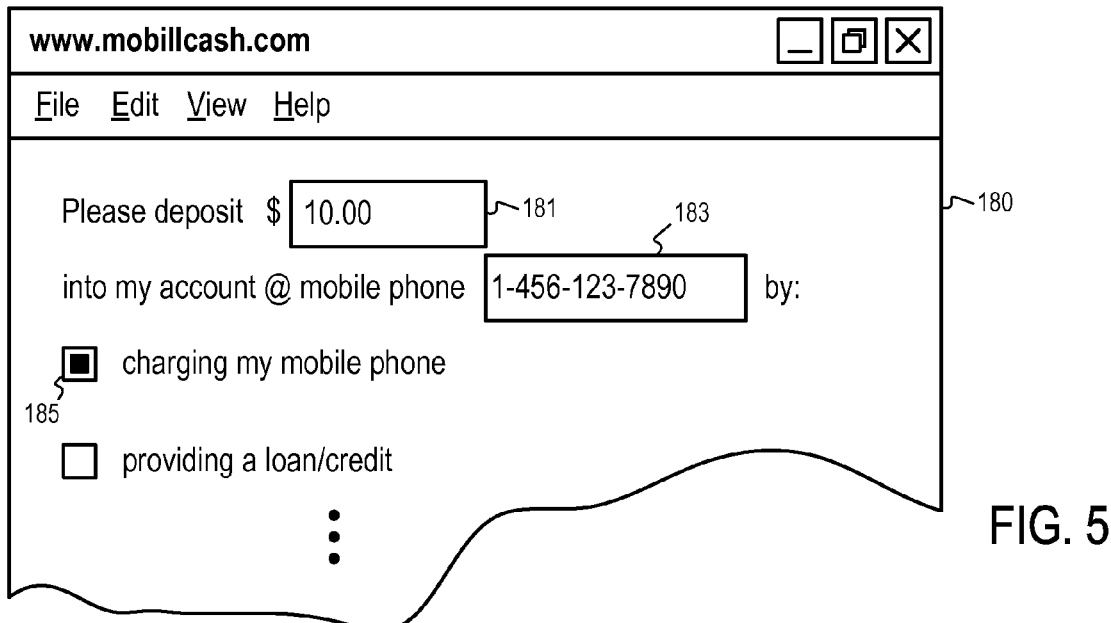
FIG. 5 illustrates a user interface to initiate a deposit transaction according to one embodiment.

FIG. 5 illustrates a user interface to initiate a deposit transaction according to one embodiment. In FIG. 5, the user interface (180) may be presented via a web browser (or a custom application) to submit a deposit request from a user terminal (111) to the interchange (101). Alternatively, the deposit request can be submitted from the mobile phone (117) via a message sent via SMS, WAP, voice mail, or via an interactive voice response (IRV) system. In FIG. 5, the user interface (180) includes a text field (181) that allows the user to specify a particular amount to be deposited into the account (121) associated with the phone number (123) specified in the text field (183).

In FIG. 5, the user interface (180) further includes an option list, which allows the user to select various ways to fund the account (121), such as charging the mobile phone (117) on its phone bill, requesting a loan (e.g., to be repaid via the phone bill), charging credit cards or bank accounts associated with the account (121), etc. In the example illustrated in FIG. 5, the checkbox (185) is selected to request a deposit via charging the mobile phone (117) (e.g., via premium messages, via operator billing by mobile phone carrier).

In one premium message billing method, the interchange (101) sends mobile terminated premium SMS messages to the mobile phone (117) to bill the user, or requests the mobile phone (117) to send mobile originated premium SMS messages to a short code representing the interchange (101).

In one operator billing method, the interchange directly sends a message to the mobile carrier of the mobile phone (117) to bill the amount on the phone bill of the mobile phone (117), without having to send a premium message to the mobile phone (117).

In one embodiment, after the deposit request is submitted via the user interface (180), the interchange (101) sends a text message to the mobile phone (117) to request a confirmation.

Figure 6:
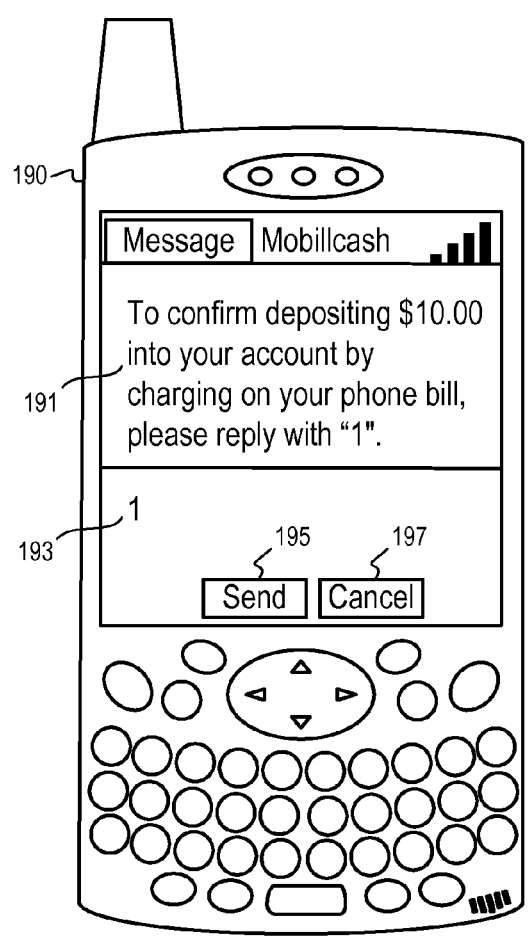
FIG. 6 illustrates a user interface to confirm a deposit transaction according to one embodiment.

FIG. 6 illustrates a user interface to confirm a deposit transaction according to one embodiment. In FIG. 6, the user interface (190) is presented via a mobile phone (117). The text message (191) from the interchange (101) includes the amount requested by the user (e.g., via the user interface (180)) and instructs the user to reply with a code (e.g., "1") to confirm the request. In one embodiment, the confirmation message (191) is transmitted to the mobile phone (117) via SMS (or text messaging via other protocols). In other embodiments, the confirmation message (191) can be sent to the mobile phone (117) via email, wireless application protocol (WAP), a voice message, a voice call from an automated voice system (e.g., controlled via an interactive voice response system), etc.

In the user interface (190), the user may enter the code (193) (e.g., "1") in the reply message and select the "send" (195) button to confirm the deposit request (or select the "cancel" (197) button to ignore the message and thus block the request).

In one embodiment, the code requested in the text message (191) is a predetermined code and is provided in the text message (191). The presence of the code in the reply message is an indication of the user approving the request; and the requirement for such a code in the reply eliminates false confirmations (e.g., generated via accidental replies or automated replies).

In some embodiments, the code requested in the text message (191) may be a personal identification number (PIN) associated with the account (121). The text message (191) does not include the code; and the knowledge of the code is an indication of the identity of the user. Thus, the use of such a code increases the security of the transaction.

In a further embodiment, the code requested in the text message (191) includes a code that is provided in response to the deposit request (e.g., via the user interface (180), not shown in FIG. 5). The code may be generated randomly at the time the request is received via the user interface (180), or when the user interface (180) is presented to the user. The code provided to the user interface (180) can be requested in the reply received in the user interface (190) to indicate that the user who is in possession of the mobile phone (117) has actual knowledge about the deposit request submitted via the user interface (180).

In a further embodiment, a secret code is provided in the confirmation message (191). The user may use the secret code in the user interface (180) provided on the user terminal (111) to confirm that the user has received the secret code provided to the mobile phone (117) and approve the deposit request via the mobile phone (117) without having to reply from the mobile phone (117). In one embodiment, the secret code is a random number, a random character string, or a random string of words generated by the interchange (101) in response to the deposit request. In some embodiment, the secret code is an identifier that represents the transaction associated with the deposit request. The user may approve the confirmation message via providing the secret code back to the interchange (101) via replying from the mobile phone (117) where the user receives the secret code, and/or replying from the user terminal (111) where the user initially submits the deposit request.

After the confirmation message is received with the correct code, the interchange (101) performs operations to fund the account (121), according to user selected options.

In some embodiments, the user may select the options via the replying text message sent via the user interface (190), instead of the user interface (180) used to make the request. In some embodiments, the user may make the request via the mobile phone (117) (e.g., by sending a text message to a short code representing the interchange (101)).

In a premium message billing method, the interchange (101) calculates the required premium messages to bill to the mobile phone (117). For example, mobile terminated premium SMS messages may have a predetermined set of prices for premium messages. The interchange (101) determines a combination of the premium messages that has a price closest to the amount specified by the user, and sends this combination of premium messages to the mobile phone (117) according to the rules (141), regulations (143), limits (145), records (147), restrictions (149), etc.

Mobile originated premium SMS messages may also have a predetermined set of prices for premium messages. The interchange (101) can calculate the set of messages required to make the deposit and transmit a text message to the mobile phone (117) of the user to instruct the user to send the required number of premium messages to make the deposit.

Figure 7:
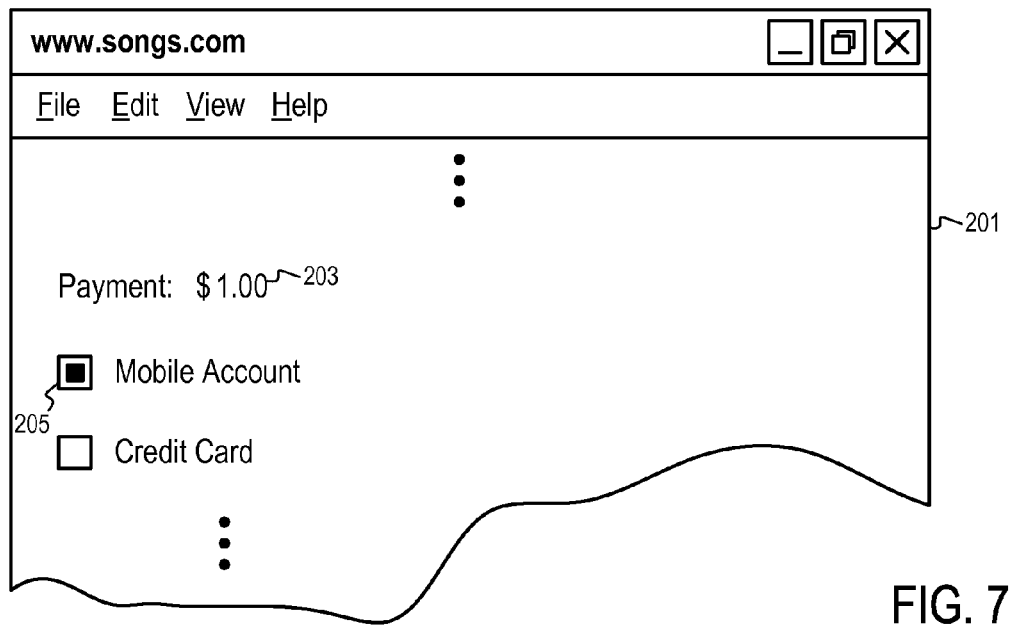
FIG. 7 illustrates a user interface to initiate a payment transaction according to one embodiment.

FIG. 7 illustrates a user interface to initiate a payment transaction according to one embodiment. In FIG. 7, the user interface (201) provides an option (205) to request the interchange (101) to process the payment for the amount (203) required to make a purchase in the server (113) of a merchant.

In one embodiment, after the user selects the payment option (205), the server (113) directs the request to the web server of the interchange (101), with a set of parameters to indicate the amount (203), the identity of the merchant, a reference to the purchase, etc. Thus, the user does not have to provide any personal information to the server (113) of the merchant to complete the payment process.

In one embodiment, the server (113) presents the payment option (205) via an online shopping cart system or a third party checkout system. Alternatively or in combination, the server (113) presents the payment option (205) via a web widget. For example, a web widget may include a program code that is portable and executable within a web page without requiring additional compilation. The web widget allows the user to select the option (205) to pay for the product and/or service without leaving the web page or refreshing the web page. In one embodiment, the interchange (101) provides the web widget to facilitate the payment processing.

Figure 8:
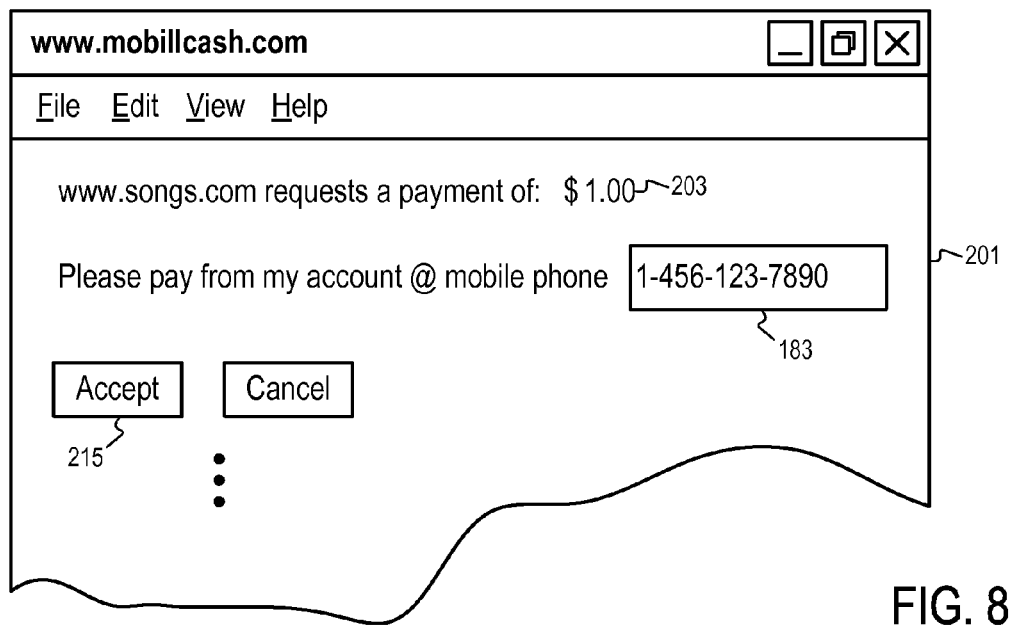
FIG. 8 illustrates a user interface to initiate a payment request according to one embodiment.

FIG. 8 illustrates a user interface to initiate a payment request according to one embodiment, after the payment request is redirected to the website of the interchange (101). In FIG. 8, the user interface (201) includes the identity of the merchant and the amount (203) of the requested payment. The user interface (201) includes a text field (183) to allow the user to provide the phone number (123) to identify the account (121).

In other embodiments, the user interface (201) may request a PIN for enhanced security. For example, the user may be required to register with the interchange (101) prior to using the services of the interchange (101); and after registering with the interchange (101), the user is provided with the PIN or can created a customized PIN to access the functionality provided by the user interface (201). User authentication may be used to reduce false messages to the phone number (123).

Alternatively, the user interface (201) may request an identifier of the account (121) to initiate the payment transaction. In some embodiments, the user interface (201) requires the user to provide no information other than the phone number (123) in the text field (183) to initiate the transaction.

In one embodiment, once the user selects the "accept" button (205), the interchange (101) transmits a confirmation message to the mobile phone (117) according to the phone number (123) provided in the text field (183).

Figure 9:
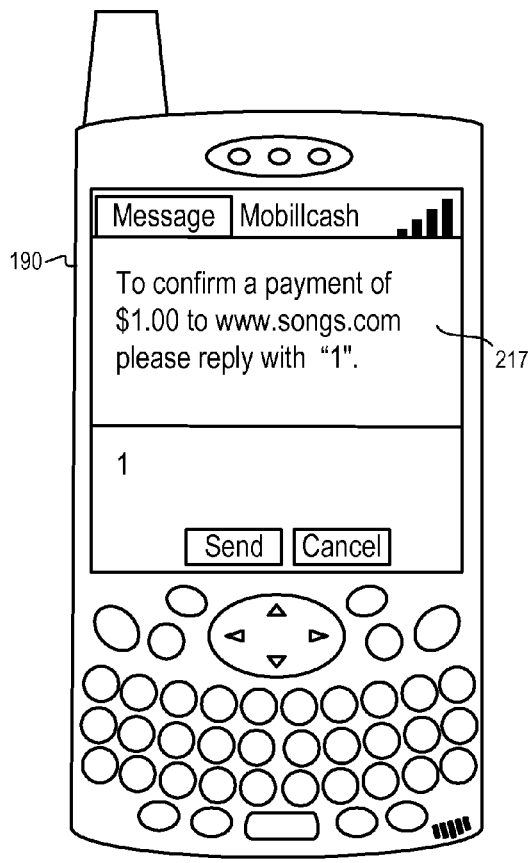
FIG. 9 illustrates a user interface to confirm a payment request according to one embodiment.

FIG. 9 illustrates a user interface to confirm a payment request according to one embodiment. In FIG. 9, the confirmation message (217) includes the amount (203) of the requested payment and the identity of the payee (e.g., a merchant operating the server (113)).

In one embodiment, the confirmation message (217) includes the instruction to reply with a code, such as a code provided in the confirmation message (217) as illustrated in FIG. 9. Alternatively, the requested code may include a PIN associated with the account (121), and/or a code (not shown) randomly generated and presented in the user interface used to initiate the payment transaction (e.g., user interface (201)). Alternatively, a secret code representing the payment request may be provided in the confirmation message (217); and the user may approve the payment transaction providing the secret code back to the interchange (101) via replying from the mobile phone (117) where the user receives the secret code, and/or replying from the user terminal (111) where the user submits the payment request.

After the correct reply is received, the interchange (101) pays the payee using the funds from the account (121) and notifies the user when the payment transaction is complete.

Figure 10:
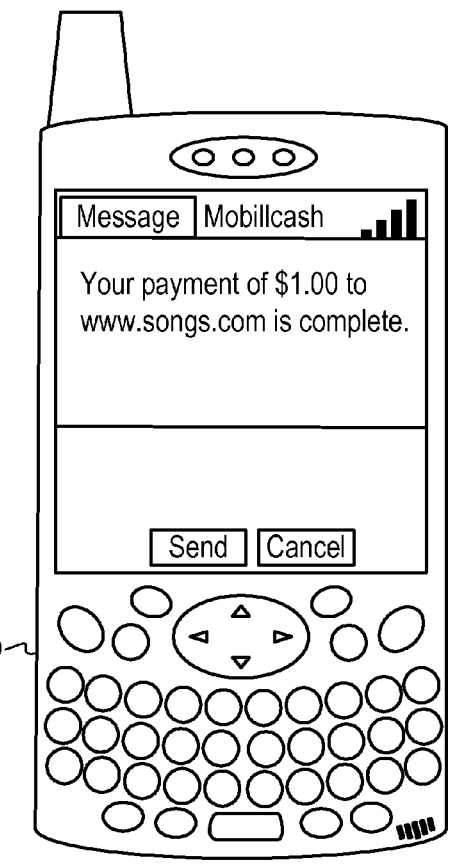
FIG. 10 illustrates a user interface to confirm the completion of a payment transaction according to one embodiment.

For example, the interchange (101) may notify the user via a text message to the mobile phone (117), as illustrated in FIG. 10. FIG. 10 illustrates a user interface to confirm the completion of a payment transaction according to one embodiment. No reply to the message that confirms the completion of the payment transaction is necessary. Once the payment transaction is complete, the user would have access to the product purchased via the payment transaction.

In one embodiment, the server (113) offers products and/or services adapted for a virtual world environment, such as an online game environment, a virtual reality environment, etc. The products may be virtual goods, which can be delivered via the transmission of data or information (without having to physically deliver an object to the user). For example, the virtual goods may be a song, a piece of music, a video clip, an article, a computer program, a decorative item for an avatar, a piece of virtual land in a virtual world, a virtual object in a virtual reality world, etc. For example, an online game environment hosted on a server (113) may sell services and products via points or virtual currency, which may be consumed by the user while engaging in a game session. For example, a virtual reality world hosted on a server (113) may have a virtual currency, which may be used by the residents of the virtual reality world to conduct virtual commerce within the virtual reality world (e.g., buy virtual lands, virtual stocks, virtual objects, services provided in the virtual reality world, etc). In other embodiments, the server (113) may also offer physical goods, such as books, compact discs, photo prints, postcards, etc.

In one embodiment, the interchange (101) stores an address of the user associated with the phone number (123). After the completion of the payment transaction, the interchange (101) provides the address to the server (113) of the merchant for the delivery of the purchased product. In some embodiments, the user may provide multiple addresses associated with the phone number (123) and may select one as a delivery address in the confirmation/approve message to the interchange (101). Alternatively, the interchange (101) may receive an address for product delivery from the mobile phone (117) together with the confirmation/approve message, and then forward the address to the server (113) of the merchant. Thus, the shipping address of the transaction is verified to be associated with the mobile phone (117). In alternative embodiments, the user may directly provide the shipping address in the website hosted on the server (113) of the merchant.

In other embodiments, the user is provided with the option to pay via the mobile phone bill associated with the phone number (123). The interchange (101) may dynamically calculate a set of premium messages, based on a set of limited number of predetermined prices for premium messages, to match the purchase price. The interchange (101) sends the set of premium messages to the mobile phone (117) at the phone number (123) to collect the funds via the telecommunication carriers to pay for the purchases. Thus, the purchase prices are not limited to the set of predetermined prices for premium messages. In some embodiments, the interchange (101) may send the set of premium messages in a period of time (e.g., a week, a month, a number of mouths, etc.) to spread the payments over the period of time (e.g., to overcome budget limits and/or limits imposed by regulations).

Figure 11:
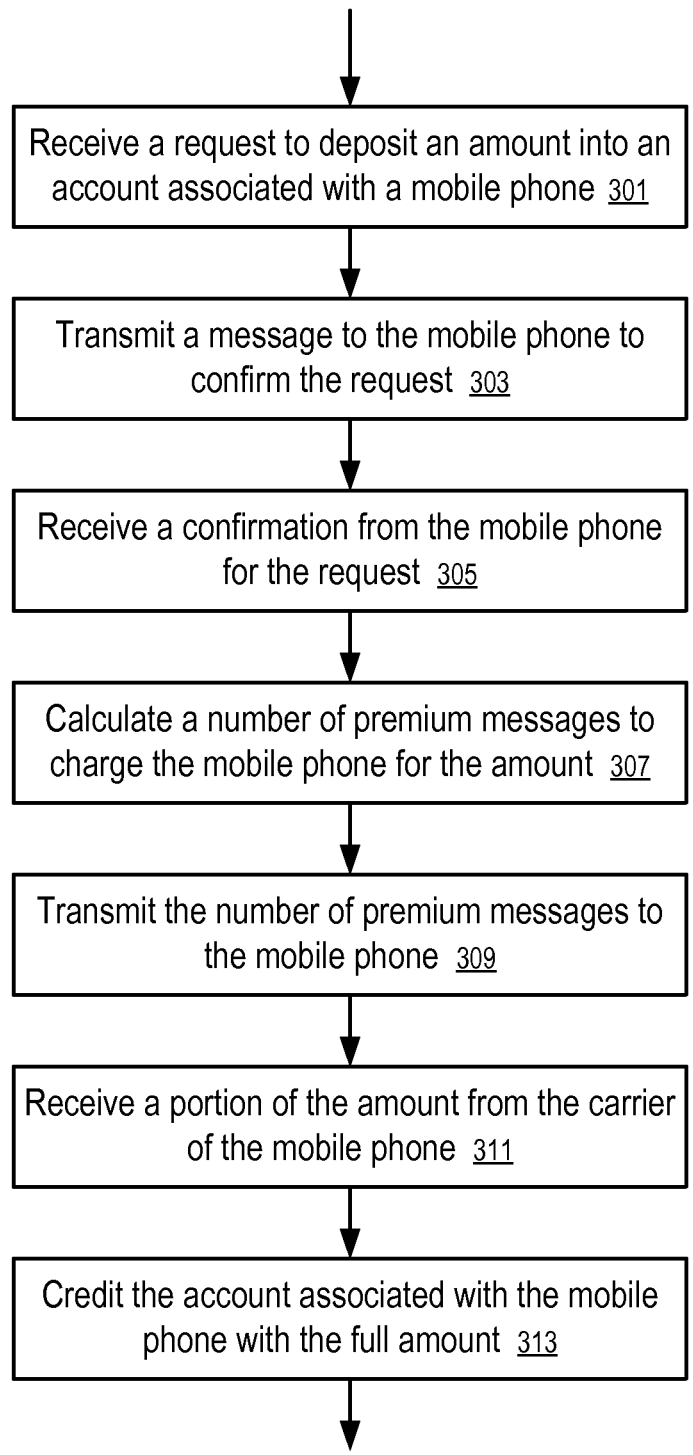
FIG. 11 shows a method to facilitate a deposit transaction according to one embodiment.

FIG. 11 shows a method to facilitate a deposit transaction according to one embodiment. In FIG. 11, the interchange (101) receives (301) a request (171) to deposit an amount into an account (121) associated with a mobile phone (117). In response, the interchange (101) transmits (303) a message (191) to the mobile phone (117) to confirm (173) the request. After receiving (305) a confirmation from the mobile phone (303) for the request, the interchange (101) calculates (307) a number of premium messages to sent to the mobile phone (117) for the amount and transmits (309) the number of premium messages to the mobile phone (117). Alternatively, the interchange (101) may include an instruction in the confirmation message to request the user to send premium SMS messages to the interchange (101).

After receiving (311) a portion of the amount from the carrier of the mobile phone (117), the interchange (101) may credit (313) the account associated with the mobile phone (117) with the full amount (or an amount larger than the portion received from the carrier, or even an amount larger than what the user is charged via the phone bill). The carrier may keep a portion of the amount as fees for the services provided by the carrier in processing the premium message.

Alternatively, the interchange (101) may credit the same amount as the portion received from the carrier, and deduct the portion that was taken by the carrier as a fee for collecting the funds via the phone bill.

Figure 12:
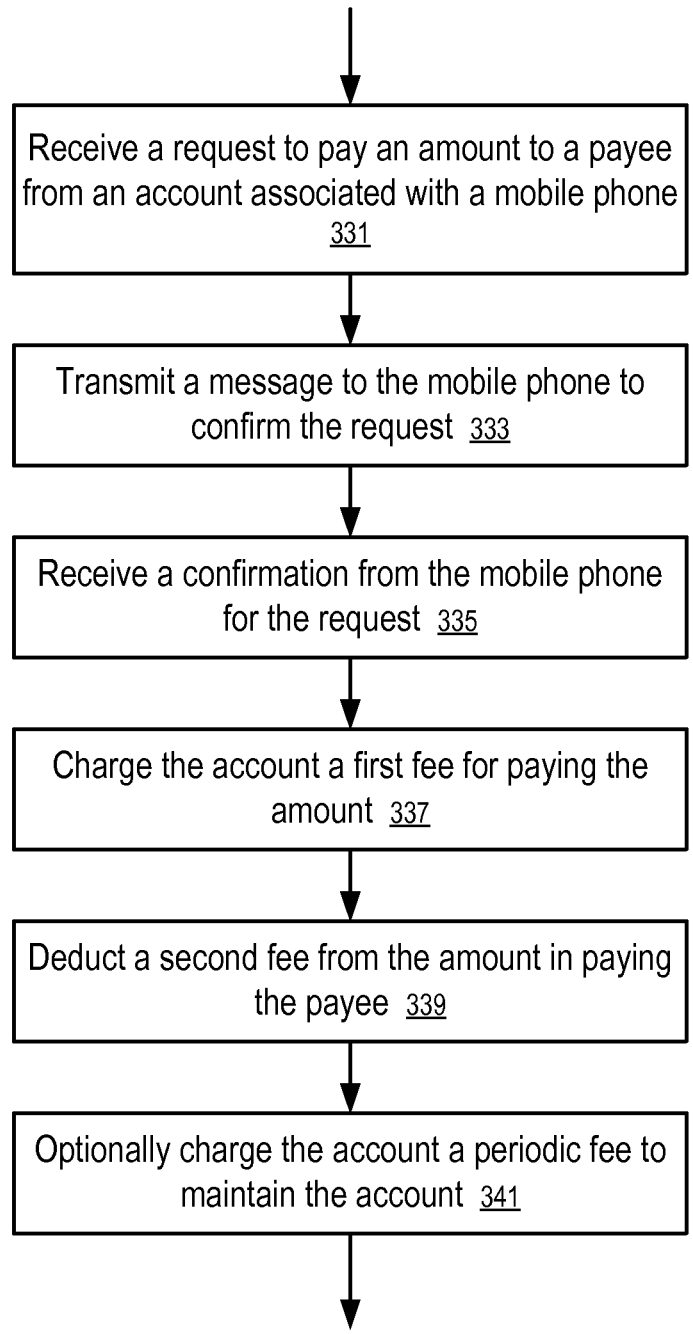
FIG. 12 shows a method to facilitate a payment transaction according to one embodiment.

FIG. 12 shows a method to facilitate a payment transaction according to one embodiment. In FIG. 12, the interchange (101) receives (331) a request to pay an amount to a payee from an account (121) associated with a mobile phone (117). In response, the interchange (101) transmits (333) a message (217) to the mobile phone (117) to confirm the request. After receiving (335) a confirmation from the mobile phone (117) for the request, the interchange (101) charges (337) the account a first fee for paying the amount and deducts (339) a second fee from the amount in paying the payee. Optionally, the interchange (101) may further charge (341) the account (121) a periodic fee to maintain the account (121), such as a monthly fee.

In one embodiment, the merchant may specify the second fee. Different merchants may offer different percentages of the purchase price as the second fee; and the interchange (101) may calculate the first fee based on the second fee offered by the merchant, by deducting the second fee from the fees charged by the telecommunication carrier for collecting the funds via the mobile phone bill associated with the telephone number (123) and/or the fees charged by the interchange (101) for processing the payments. Since the first fee is charged to the customer (e.g., the purchaser of products and services), the cost to the customer can vary based on the selection of the merchant. For the same purchase price, the first fee (and thus the cost to the customer) may be different for purchases made via different merchants, because the merchants may offer a different percentage of the purchase price as the second fee. In some embodiments, the first and second fees include both fees charged by the telecommunication carrier for collecting the funds via the mobile phone bill/account associated with the phone number (123) and the fees charged by the interchange (101) for processing the payments. In some embodiments, the first fee includes the fees charged by the telecommunication carrier but no fees charged by the interchange (101). In some embodiments, the second fee includes the fees charged by the telecommunication carrier but no fees charged by the interchange (101). In some embodiments, the first fee and/or the second fee do not include the fees charged by the telecommunication carrier. In some embodiments, the first fee is not charged; and in other embodiments, the second fee is not charged.

In one embodiment, making a payment using the interchange (101) via the mobile phone (117) involves network charge, in addition to the purchase price, such as fees collected by the telecommunication carries to process the premium messages and to collect the payments according to the prices of the premium messages, fees collected by the interchange (101) to process the payments, etc. The interchange (101) may provide a communication interface (e.g., a user interface (UI) or an application programming interface (API)) to dynamically receive from merchants input specifying how much of the network charge the merchants would like to pass on to the customers. For example, a merchant can obtain 100% of their revenue, as defined by the purchase prices, by passing network charges on to customers, or obtain a portion of the revenue by offering to pay part of the network charges and pass part of the network charges on to the customer, or offer to pay for the network charges without passing the network charges on to the customer. The interface (101) allows the merchant to change in real time the portion of the network charges that is passed on to the customers. The merchant may offer to pay a percentage of the network charge, or a fixed amount. The merchant can offer to pay a first percentage of the network charge during a first period of time, and a second percentage of the network charge during a second period of time. Thus, the interface (101) allows the merchant to adjust the offers to maximize profit.

Figure 13:
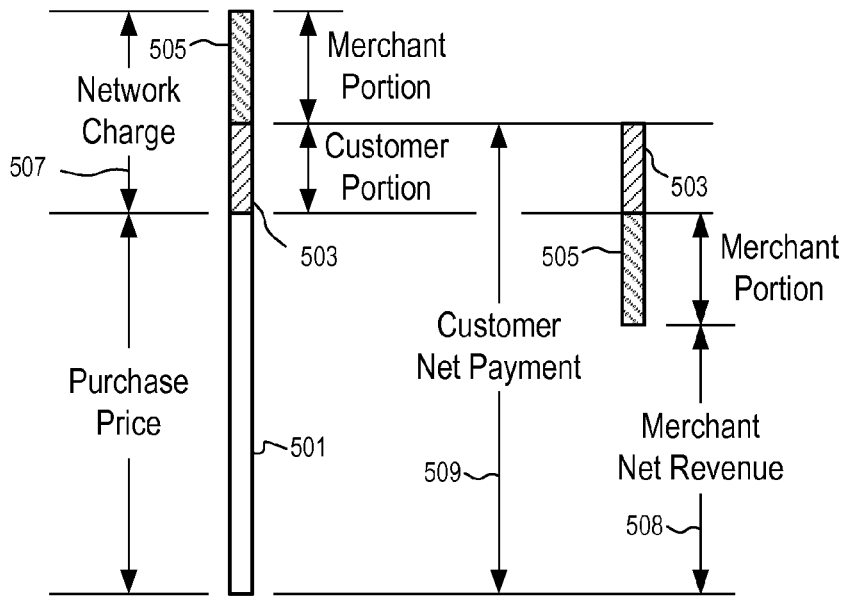
FIG. 13 shows a method to divide network charges between customers and merchants according to one embodiment.

FIG. 13 shows a method to divide network charges between customers and merchants according to one embodiment. In FIG. 13, the merchant specifies the purchase price (501) for a product or service. In one embodiment, a user may choose to pay the purchase price (501) via different payment options, such as credit cards, check accounts, or mobile phones via the interchange (101).

When the user chooses to pay the purchase price (501) via the interchange (101), the interchange (101) collects payments via sending premium messages to the mobile phone (117) of a customer. After a premium message is sent from the interchange (101) to the mobile phone (117), the telecommunication carrier of the mobile phone (117) charges the mobile phone (117) according to a predetermined price of the premium message and then provides funds to the interchange (101) after deducting service charges. The service charges deducted by the telecommunication carrier are at least part of the network charge (507). The service charges deducted by the telecommunication carrier are not available for the payment towards the purchase price (501).

In some embodiments, the telecommunication carrier charges a fixed, predetermined percentage of the predetermined price of the premium message as the service charges. In alternative embodiments, the telecommunication carrier may charge a fixed amount for each premium message, independent of the prices of the premium messages.

In some embodiments, the interchange (101) may also deduct a portion of the received funds as service charges, before sending the remaining part of the funds collected from the telecommunication carrier to the merchant as the payment towards the purchase price (501). The services charges deducted by the interchange (101) may also be considered as a part of the network charge (507).

If the merchant does not offer to pay any part of the network charge (507) (e.g., decides to pass the entire network charge (507) on to the customer), the customer has to pay the sum of the network charge (507) and the purchase price (501) to the telecommunication carrier to have sufficient funds passed to the interchange (101) to pay the merchant the purchase price (501).

In FIG. 13, the merchant may offer to pay for a merchant portion (505) of the network charge (507). As the merchant offers to increase the size of the merchant portion (505) of the network charge (507) paid by the merchant, the remaining customer portion (503) passed on to the customer is reduced; and thus, the customer net payment (509) is also reduced by the merchant portion (505). Such an offer from the merchant provides an incentive for the customer to use the interchange (101) to make a payment via the mobile phone (117) of the customer. When the merchant offers to pay the entire network charge (507), the customer net payment (509) is the same as the purchase price.

However, the merchant portion (505) reduces the profit margin of the merchant. As illustrated in FIG. 13, the merchant net revenue (508) is the different between the purchase price and the merchant portion (505).

As the merchant decreases the size of the merchant portion (505), the remaining customer portion (503) increases, which increases the customer net payment (509), which may be a disincentive for the customer to use the interchange (101) to pay via the mobile phone (117). However, as illustrated in FIG. 13, the merchant net revenue (508) is the difference between the purchase price (501) and the merchant portion (505) of the network charge (507) that is paid by the merchant. Reducing the merchant portion (505) offered by the merchant can increase the profit margin for the merchant.

Thus, the merchant can adjust the size of the merchant portion (505) of the network charge (507) offered by the merchant to balance the need to increase the conversion/purchase rate (e.g., by increasing the size of the merchant portion (505)) and the need to increase the profit margin (e.g., by decreasing the size of the merchant portion (505)).

In one embodiment, the interchange (101) allows the merchant to dynamically change the size of the merchant portion (505). The interchange (101) may allow the merchant to specify a first size for a first type of products or services and a second size for a second type of products or services. The interchange (101) may allow the merchant to specify a first size during a first period of time and a second size during a second period of time. The interchange (101) provides a user interface or an application programming interface to receive the specification of the size of the merchant portion (505) offered by the merchant (or the size of the customer portion (503) to be passed on to the customer).

For example, the merchant portion (505) of the network charge (507) may be specified by the merchant as a percentage (e.g., x %) of the network charge (507). The network charge (507) may be a predetermined percentage (e.g., y %) of the customer net payment (509). Thus, for a given purchase price (501) (e.g., p) specified by the merchant, the interchange (101) can calculate the customer net payment (509) (e.g., $p/[1-y\% \times (1-x\%)]$).

In one embodiment, each premium message that the interchange (101) sends to the mobile phone (117) has a predetermined price selected from a predetermined number of options. The interchange (101) is configured to determine a combination of one or more premium messages that best matches the customer net payment (509). In one embodiment, the best match is a combination of premium messages that has a total price closest to the customer net payment (509). In another embodiment, the best match is the combination of premium messages that has the lowest total price equal to or larger than the customer net payment (509).

In other embodiments, the merchant may specify the merchant portion (505) of the network charge (507) as a fixed amount for each purchase, or specify the merchant portion (505) of the network charge (507) via a look up table, based on the purchase price (501), the time of the day, and/or other considerations, such as the location or geographic region of the customer.

Figure 14:
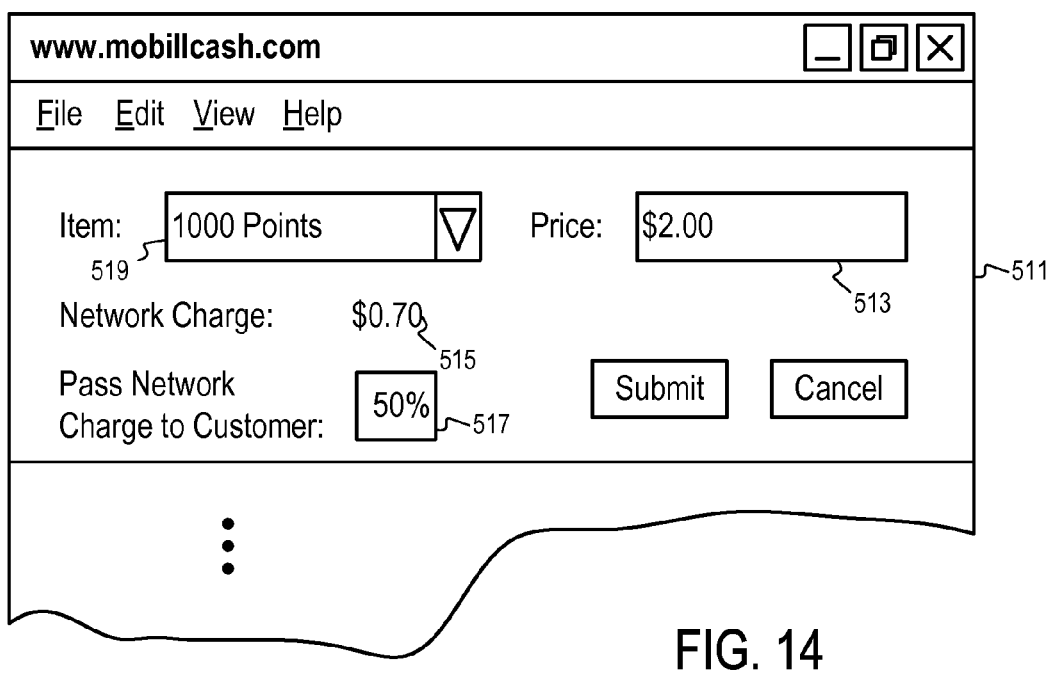
FIG. 14 shows a user interface to receive inputs from merchants to pass a portion of network charges to customers according to one embodiment.

FIG. 14 shows a user interface to receive inputs from merchants to pass a portion of network charges to customers according to one embodiment. In FIG. 14, the user interface (511) may be presented via a web page displayed in a web browser, or via a dedicated user application.

In FIG. 14, the merchant may use the input box (519) to specify an item that a customer may purchase and use the input box (513) to specify the price for the item. Based on the price (513), the user interface (511) computes the size of the network charge (507). The merchant can then use the input box (517) to specify the size of the customer portion (503) (e.g., as a percentage of the computed network charge (515) or, alternatively, as a fixed amount).

In some embodiments, as a promotion or incentive, the merchant may offer to pay for more than 100% of the network charge (507), which effectively provides a deep discount on the purchase price (501). In this case the customer net payment (509) for using the interchange (101) to pay via the mobile phone (117) becomes lower than the purchase price (501) that the user would have to pay if the user were to pay via other payment methods, such as credit cards.

In one embodiment, the item offered by the merchant is a virtual object, such as points, stars, virtual currency/money redeemable for playing games, a song, a piece of music, a video clip, an article, a computer program, a decorative item for an avatar, a piece of virtual land in a virtual world, or a virtual object in a virtual reality world. In other embodiments, the item offered by the merchant is a physical object, or a service in real world.

In one embodiment, the merchant may offer additional incentives in specifying the purchase price (501) and the customer portion (503) of the network charge (507). For example, the merchant may offer bonus points, stars, virtual currency/money redeemable for playing games, or other items.

In one embodiment, the interchange stores in the data storage facility (107) the input received from the merchant via the user interface (511) and processes future transactions based on the input.

FIG. 14 illustrates a user interface (511) provided to the merchant to specify the price (513) and the size (517) of the customer portion (503) of the network charge (507). Alternatively, or in combination, the interchange (101) may provide an application programming interface to receive the corresponding input in an automated way.

Figure 15:
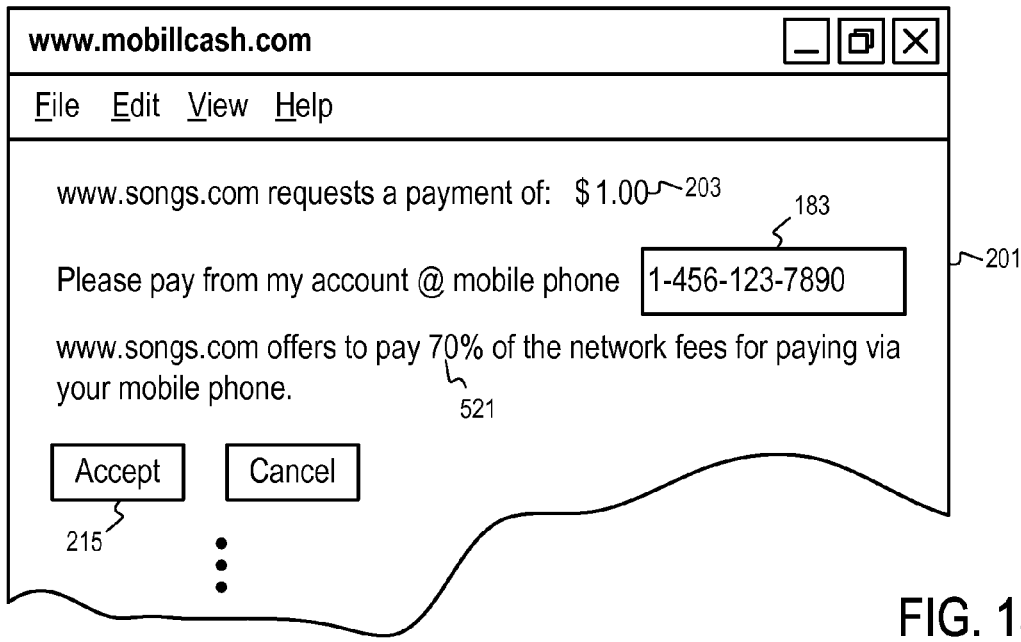
FIG. 15 shows a user interface to provide customers with information on network charges according to one embodiment.

FIG. 15 shows a user interface to provide customers with information on network charges according to one embodiment. In FIG. 15, the interchange (101) provides a web confirmation page (201) to ask the customer to confirm a payment request. The confirmation page (201) indicates the purchase price (203), the phone number (123) of the mobile phone (117) of the customer as specified in entry box (183), and the size (521) of the merchant portion (505) of the network charge (507).

In some embodiments, the confirmation page (201) may further include the customer net payment (509). Alternatively or in combination, the confirmation page (201) may include the total price of the set of premium messages that are to be transmitted to the mobile phone (117) at the mobile phone number (123) specified in entry box (183).

In one embodiment, after the user selects the accept button (215) in the web confirmation page (201), the interchange (101) sends a non-premium message to the mobile phone (117) to confirm the payment. After the user responds to the non-premium message to confirm the payment via the mobile phone (117), the interchange (101) transmits the set of the premium messages to the mobile phone (117).

Figure 16:
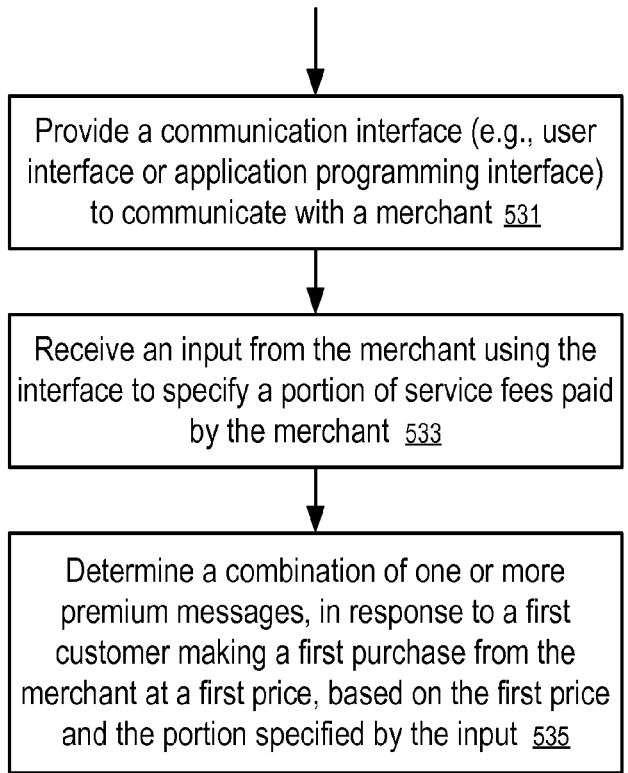
FIG. 16 shows a method to determine a combination of premium messages to pay for a purchase according to one embodiment.

FIG. 16 shows a method to determine a combination of premium messages to pay for a purchase according to one embodiment. In FIG. 16, the interchange (101) provides (531) a communication interface (e.g., user interface or application programming interface) to communicate with a merchant. After the interchange (101) receives (533) an input from the merchant using the interface to specify a portion of service fees paid by the merchant, the interchange (101) determines (535) a combination of one or more premium messages, in response to a first customer making a first purchase from the merchant at a first price, based on the first price and the portion specified by the input.

In one embodiment, the input specifies the portion as a percentage of the service charges associated with the one or more premium messages; and the interchange (101) may subsequently receive an input from the merchant using the interface to change the percentage for subsequent purchases.

In one embodiment, the input specifies the portion as a fixed amount; and the interchange (101) may subsequently receive a second input from the merchant using the interface to change the fixed amount for purchases that occur after the second input.

In one embodiment, the input is for first items offered by the merchant, such as products, services, virtual objects, points, virtual currency, credits, etc.; and the method further includes: receiving a second input from the merchant using the interface for second items offered by the merchant; and determining, by the computing device, a combination of a second one or more premium messages, in response to a second customer purchasing one of the second items from the merchant, where a total price of the second one or more premium messages is based on a second portion of service charges associated with the second one or more premium messages, and the second portion is specified by the second input received via the interface.

In one embodiment, the input includes an identification of an item sold in the first purchase and is specific for the item.

In one embodiment, the interchange (101) presents a web page to confirm payment to be made via the one or more premium messages; in response to confirmation via the web page, the interchange (101) transmits a non-premium message to a mobile phone (117) of the first customer to confirm payment to be made via the one or more premium messages; and after receiving a response to the non-premium message, the interchange (101) transmits the one or more premium messages to the mobile phone (117) of the first customer.

In one embodiment, the web page (201 in FIG. 15) identifies to the first customer that the merchant offers (521) to pay for the portion (505) of service charges (504) associated with the one or more premium messages.

In one embodiment, the non-premium message indicates that the merchant offers to pay for the portion (505) of service charges (504) associated with the one or more premium messages.

Figure 17:
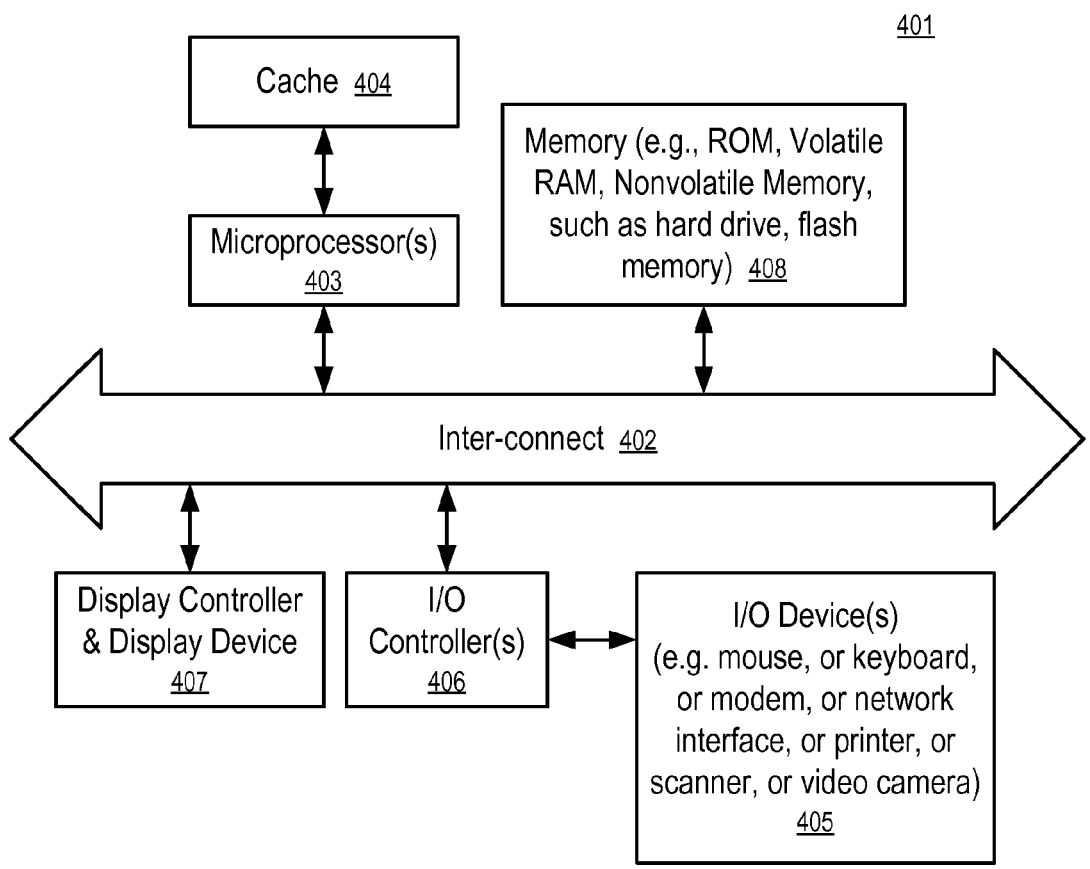
FIG. 17 shows a data processing system, which can be used in various embodiments.

FIG. 17 shows a data processing system, which can be used in various embodiments. While FIG. 17 illustrates various components of a computer system, it is not intended to represent any particular architecture or manner of interconnecting the components. Some embodiments may use other systems that have fewer or more components than those shown in FIG. 17.

In one embodiment, each of the interchange (101), the data storage facility (107), the controllers (115), the mobile phones (117), the user terminals (111) and the servers (113) can be implemented as a data processing system, with fewer or more components, as illustrated in FIG. 17.

In FIG. 17, the data processing system (401) includes an inter-connect (402) (e.g., bus and system core logic), which interconnects a microprocessor(s) (403) and memory (408). The microprocessor (403) is coupled to cache memory (404) in the example of FIG. 17.

The inter-connect (402) interconnects the microprocessor(s) (403) and the memory (408) together and also interconnects them to a display controller, display device (407), and to peripheral devices such as input/output (I/O) devices (405) through an input/output controller(s) (406).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (402) may include one or more buses connected to one another through various bridges, controllers and/or adapters. In one embodiment, the I/O controller (406) includes a USB (Universal Serial Bus) adapter for controlling USB peripherals, and/or an IEEE-1394 bus adapter for controlling IEEE-1394 peripherals.

The memory (408) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

The computer-readable media may store the instructions. The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable media and are not configured to store instructions.

In general, a tangible machine readable medium includes any apparatus that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer implemented method, comprising:
   receiving, by a computing device, a request for a purchase from a merchant computer system;
   providing, by the computing device, an interface to the merchant computer system, wherein the computing device transmits the interface to the merchant computer system after receiving the request from the merchant computer system;
   transmitting, by the computing device, at least one option via the interface that is selectable by the merchant computer system;
   receiving, by the computing device using the interface, a first input based on the option from the merchant computer system via the interface;
   determining, by the computing device, a price of the purchase, wherein the price is based on the first input from the merchant computer system;
   transmitting, by the computing device, the price to the customer computing device;
   receiving, by the computing device, a purchase from the customer computing device in response to the transmission of the price; and
   charging, by the computing device, a customer account based on the price in response to the purchase,
   wherein the price is a total price that is based on a first price and a portion of service charges associated with at least one message, the portion being specified by the input received via the interface, the input specifies the portion as a percentage of the service charges associated with the at least one message.

2. The method of claim 1, wherein the interface comprises a web based user interface.

3. The method of claim 1, wherein the interface comprises an application programming interface.

4. The method of claim 1, further comprising:
   receiving, in the computing device, an input from the merchant using the interface to change the percentage for subsequent purchases.

5. The method of claim 1, wherein the first input specifies the portion as a fixed amount.

6. The method of claim 5, further comprising:
   receiving, in the computing device, a second input from the merchant using the interface to change the fixed amount for purchases that occur after the second input.

7. The method of claim 1, wherein the input is for first items offered by the merchant; and the method further comprises:
   receiving, in the computing device, a second input from the merchant using the interface for second items offered by the merchant; and
   determining, by the computing device, a price of a second purchase based on a second input from the merchant computer system;
   transmitting, by the computing device, the price of the second purchase to the customer computing device;
   receiving, by the computing device, a purchase from the customer computing device in response to the transmission of the price of the second purchase; and
   charging, by the computing device, a customer account based on the price of the second purchase in response to the second purchase.

8. The method of claim 7, wherein each purchase is for one of: products and services.

9. The method of claim 7, wherein each purchase is for virtual objects.

10. The method of claim 9, wherein each purchase is for one of points, virtual currency, and credits.

11. The method of claim 7, wherein the input includes the first price.

12. The method of claim 11, wherein the input includes an identification of an item sold in the first purchase.

13. The method of claim 1, further comprising:
   presenting, by the computing apparatus, a web page to confirm payment to be made via one or more premium messages;
   in response to a confirmation via the web page, transmitting a non-premium message to a mobile phone of the first customer to confirm payment to be made via the one or more premium messages; and
   after receiving a response to the non-premium message, transmitting, by the computing apparatus, the one or more premium messages to the mobile phone of the customer.

14. The method of claim 13, wherein the web page identifies to the customer that the merchant offers to pay for the portion of service charges associated with the one or more premium messages.

15. The method of claim 13, wherein the non-premium message indicates that the merchant offers to pay for the portion of service charges associated with the one or more premium messages.

16. A non-transitory computer storage medium storing instructions, the instructions causing a computing device to perform a method, the method comprising:
   receiving, by a computing device, a request for a purchase from a merchant computer system;
   providing, by the computing device, an interface to the merchant computer system, wherein the computing device transmits the interface to the merchant computer system after receiving the request from the merchant computer system;
   transmitting, by the computing device, at least one option via the interface that is selectable by the merchant computer system;
   receiving, by the computing device using the interface, a first input based on the option from the merchant computer system via the interface;
   determining, by the computing device, a price of the purchase, wherein the price is based on the first input from the merchant computer system;
   transmitting, by the computing device, the price to the customer computing device;
   receiving, by the computing device, a purchase from the customer computing device in response to the transmission of the price; and
   charging, by the computing device, a customer account based on the price in response to the purchase,
   wherein the price is a total price that is based on a first price and a portion of service charges associated with at least one message, the portion being specified by the input received via the interface, the input specifies the portion as a percentage of the service charges associated with the at least one message.

* * * * *